US012309731B2

(12) United States Patent
Rico Alvarino et al.

(10) Patent No.: US 12,309,731 B2
(45) Date of Patent: May 20, 2025

(54) TIMING AND SYNCHRONIZATION TECHNIQUES FOR SECURE NETWORKS

(71) Applicant: QUALCOMM Incorporated, San Diego, CA (US)

(72) Inventors: Alberto Rico Alvarino, San Diego, CA (US); Kazuki Takeda, Minato-ku (JP); Peter Gaal, San Diego, CA (US); Juan Montojo, San Diego, CA (US); Le Liu, San Diego, CA (US); Javier Rodriguez Fernandez, San Diego, CA (US); Xiao Feng Wang, San Diego, CA (US); Umesh Phuyal, San Diego, CA (US); Edward George Tiedemann, Jr., Concord, MA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/948,706

(22) Filed: Sep. 20, 2022

(65) Prior Publication Data
US 2024/0098671 A1    Mar. 21, 2024

(51) Int. Cl.
H04W 56/00    (2009.01)
H04W 12/037    (2021.01)
H04W 12/06    (2021.01)

(52) U.S. Cl.
CPC ....... *H04W 56/005* (2013.01); *H04W 12/037* (2021.01); *H04W 12/06* (2013.01); *H04W 56/0065* (2013.01)

(58) Field of Classification Search
CPC . H04W 56/005; H04W 12/037; H04W 12/06; H04W 56/0065
See application file for complete search history.

(56) References Cited

U.S. PATENT DOCUMENTS

2008/0080472 A1\* 4/2008 Bertrand ................ H04J 11/005
370/344
2010/0005312 A1 1/2010 Rom et al.
(Continued)

FOREIGN PATENT DOCUMENTS

EP    1626363 A1    2/2006
EP    3869218 A1    8/2021
WO    WO-2014175990 A1    10/2014

OTHER PUBLICATIONS

International Search Report and Written Opinion—PCT/US2023/072862—ISA/EPO—Feb. 27, 2024.
(Continued)

*Primary Examiner* — Samina F Choudhry
(74) *Attorney, Agent, or Firm* — Holland & Hart LLP

(57) ABSTRACT

Methods, systems, and devices for wireless communication are described. A user equipment (UE) may monitor a set of time-frequency resources for one or more cell detection signals (CDS) associated with a pseudo-random sequence, where the pseudo-random sequence and the set of time-frequency resources are indicated by an output of a pseudo-random function (PRF) that is based on a timing parameter, a cell identifier (ID), and a shared key. Accordingly, the UE may communicate with a network entity via a cell associated with the cell ID based on receiving the one or more CDS. The UE may also exchange one or more messages with the network entity, and may perform a time calibration procedure based on the one or more messages and a delay threshold of the UE. The one or more messages may indicate an ID of the UE, a cryptographic number, a time interval, or a combination thereof.

12 Claims, 21 Drawing Sheets

(56) References Cited

U.S. PATENT DOCUMENTS

| | | |
|---|---|---|
| 2010/0124331 A1 | 5/2010 | Park et al. |
| 2015/0161367 A1 | 6/2015 | Lu et al. |
| 2017/0265069 A1* | 9/2017 | Palanigounder ...... H04L 9/0643 |
| 2019/0103950 A1* | 4/2019 | Liu ........................ H04W 8/24 |
| 2019/0253213 A1* | 8/2019 | Garlapati ............ H04J 13/0029 |
| 2021/0266109 A1* | 8/2021 | Shrestha ............... H04L 1/1819 |

OTHER PUBLICATIONS

Partial International Search Report—PCT/US2023/072862—ISA/EPO—Dec. 20, 2023.

* cited by examiner

TIMING AND SYNCHRONIZATION TECHNIQUES FOR SECURE NETWORKS

FIELD OF TECHNOLOGY

The following relates to wireless communication, including timing and synchronization techniques for secure networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems, such as military or tactical networks, may be susceptible to attacks from external threats. Conventional mechanisms for improving the overall security of such systems may be associated with higher costs and hardware requirements, which may be unsuitable for some deployments.

SUMMARY

The described techniques relate to improved methods, systems, devices, and apparatuses that support timing and synchronization techniques for secure networks. For example, the described techniques may improve the security of communications between a user equipment (UE) and a network entity in a wireless communications system.

In accordance with aspects of the present disclosure, a UE may monitor a set of time-frequency resources for one or more cell detection signals (CDS) associated with a pseudo-random sequence. The set of time-frequency resources and the pseudo-random sequence may be indicated by an output of a pseudo-random function (PRF) that is based on a timing parameter, a cell identifier (ID), and a shared key. The UE may communicate with a network entity via a cell associated with the cell ID based on monitoring the set of time-frequency resources for the one or more CDS.

Additionally, or alternatively, the UE may transmit a first message that indicates an ID of the UE and a first cryptographic number. The UE may receive a second message in response to the first message, where the second message indicates the ID of the UE, a first time interval, and a second cryptographic number. The UE may perform a time calibration procedure based on the second message, a second time interval between reception of the second message and transmission of the first message, and a delay threshold of the UE.

A method for wireless communication at a UE is described. The method may include monitoring a set of time-frequency resources for one or more CDS associated with a pseudo-random sequence, where the pseudo-random sequence and the set of time-frequency resources are indicated by an output of a PRF that is based on a timing parameter, a cell ID, and a shared key. The method may further include communicating with a network entity via a cell associated with the cell ID based on monitoring the set of time-frequency resources for the one or more CDS.

An apparatus for wireless communication at a UE is described. The apparatus may include a processor, memory coupled with the processor, and instructions stored in the memory. The instructions may be executable by the processor to cause the apparatus to monitor a set of time-frequency resources for one or more CDS associated with a pseudo-random sequence, where the pseudo-random sequence and the set of time-frequency resources are indicated by an output of a PRF that is based on a timing parameter, a cell ID, and a shared key. The instructions may be further executable by the processor to cause the apparatus to communicate with a network entity via a cell associated with the cell ID based on monitoring the set of time-frequency resources for the one or more CDS.

Another apparatus for wireless communication at a UE is described. The apparatus may include means for monitoring a set of time-frequency resources for one or more CDS associated with a pseudo-random sequence, where the pseudo-random sequence and the set of time-frequency resources are indicated by an output of a PRF that is based on a timing parameter, a cell ID, and a shared key. The apparatus may further include means for communicating with a network entity via a cell associated with the cell ID based on monitoring the set of time-frequency resources for the one or more CDS.

A non-transitory computer-readable medium storing code for wireless communication at a UE is described. The code may include instructions executable by a processor to monitor a set of time-frequency resources for one or more CDS associated with a pseudo-random sequence, where the pseudo-random sequence and the set of time-frequency resources are indicated by an output of a PRF that is based on a timing parameter, a cell ID, and a shared key. The instructions may be further executable by the processor to communicate with a network entity via a cell associated with the cell ID based on monitoring the set of time-frequency resources for the one or more CDS.

Some examples of the methods, apparatuses, and non-transitory computer-readable media described herein may further include operations, features, means, or instructions for obtaining two or more bit sequences based on making two or more calls to the PRF.

Some examples of the methods, apparatuses, and non-transitory computer-readable media described herein may further include operations, features, means, or instructions for generating the pseudo-random sequence and resource location information by aggregating the two or more bit sequences, where the resource location information indicates the set of time-frequency resources.

Some examples of the methods, apparatuses, and non-transitory computer-readable media described herein may further include operations, features, means, or instructions for generating a first pseudo-random sequence and first frequency location at a first time.

Some examples of the methods, apparatuses, and non-transitory computer-readable media described herein may further include operations, features, means, or instructions for generating a second pseudo-random sequence and second frequency location information at a second time, where a duration between the first time and the second time corresponds to a periodicity of the one or more CDS.

Some examples of the methods, apparatuses, and non-transitory computer-readable media described herein may further include operations, features, means, or instructions for generating multiple bits that indicate one or more symbol locations and physical resource block (PRB) locations to monitor for the one or more CDS.

In some examples of the methods, apparatuses, and non-transitory computer-readable media described herein, monitoring the set of time-frequency resources may include operations, features, means, or instructions for performing a frequency-domain correlation of multiple resource elements (REs) in the set of time-frequency resources.

Some examples of the methods, apparatuses, and non-transitory computer-readable media described herein may further include operations, features, means, or instructions for identifying multiple cell groups associated with a respective multiple cell group IDs.

Some examples of the methods, apparatuses, and non-transitory computer-readable media described herein may further include operations, features, means, or instructions for generating a pseudo-random output for each cell group of the multiple cell groups based on the respective multiple cell group IDs, where the pseudo-random output includes a pseudo-random sequence and a set of time-frequency resource locations associated with one of the multiple cell groups.

Some examples of the methods, apparatuses, and non-transitory computer-readable media described herein may further include operations, features, means, or instructions for selecting a subset of the multiple cell groups based on monitoring the set of time-frequency resource locations associated with each of the multiple cell groups Some examples of the methods, apparatuses, and non-transitory computer-readable media described herein may further include operations, features, means, or instructions for generating a pseudo-random output for each cell in the subset of the multiple cell groups, where the pseudo-random output includes a pseudo-random sequence and a set of time-frequency resource locations associated with a cell in the subset of the multiple cell groups.

In some examples of the methods, apparatuses, and non-transitory computer-readable media described herein, the one or more CDS includes a primary CDS (P-CDS) that is time division multiplexed (TDM) with a secondary CDS (S-CDS).

Some examples of the methods, apparatuses, and non-transitory computer-readable media described herein may further include operations, features, means, or instructions for generating a pseudo-random cell ID that is a function of the shared key, a physical cell ID (PCID) associated with the cell of the network entity, and a timestamp associated with generation of the pseudo-random cell ID, where the output of the pseudo-random function is based on the pseudo-random cell ID.

In some examples of the methods, apparatuses, and non-transitory computer-readable media described herein, the timestamp indicates a slot, a system frame number (SFN), or a coordinated universal time (UTC) associated with generation of the pseudo-random cell ID.

Some examples of the methods, apparatuses, and non-transitory computer-readable media described herein may further include operations, features, means, or instructions for performing a Boolean operation on one or more least significant bits (LSBs) of a pseudo-random output and the PCID associated with the cell of the network entity, where generating the pseudo-random cell ID is based on a result of the Boolean operation.

Some examples of the methods, apparatuses, and non-transitory computer-readable media described herein may further include operations, features, means, or instructions for generating the output of the PRF based on a time drift threshold of the UE, where the output indicates a pseudo-random bit sequence and a set of time-frequency resource locations Some examples of the methods, apparatuses, and non-transitory computer-readable media described herein may further include operations, features, means, or instructions for monitoring the set of time-frequency resource locations for one or more timing synchronization signals (TSS) that indicate the pseudo-random bit sequence.

Some examples of the methods, apparatuses, and non-transitory computer-readable media described herein may further include operations, features, means, or instructions for acquiring absolute timing information based on measuring the one or more TSS, where the timing parameter is based on the absolute timing information.

A method for wireless communication at a network entity is described. The method may include transmitting, via a set of time-frequency resources, one or more CDS associated with a pseudo-random sequence, where the pseudo-random sequence and the set of time-frequency resources are indicated by an output of a PRF that is based on a timing parameter, a cell ID, and a shared key. The method may further include communicating with a UE via a cell associated with the cell ID based on transmitting the one or more CDS via the set of time-frequency resources.

An apparatus for wireless communication at a network entity is described. The apparatus may include a processor, memory coupled with the processor, and instructions stored in the memory. The instructions may be executable by the processor to cause the apparatus to transmit, via a set of time-frequency resources, one or more CDS associated with a pseudo-random sequence, where the pseudo-random sequence and the set of time-frequency resources are indicated by an output of a PRF that is based on a timing parameter, a cell ID, and a shared key. The instructions may be further executable by the processor to cause the apparatus to communicate with a UE via a cell associated with the cell ID based on transmitting the one or more CDS via the set of time-frequency resources.

Another apparatus for wireless communication at a network entity is described. The apparatus may include means for transmitting, via a set of time-frequency resources, one or more CDS associated with a pseudo-random sequence, where the pseudo-random sequence and the set of time-frequency resources are indicated by an output of a PRF that is based on a timing parameter, a cell ID, and a shared key. The apparatus may further include means for communicating with a UE via a cell associated with the cell ID based on transmitting the one or more CDS via the set of time-frequency resources.

A non-transitory computer-readable medium storing code for wireless communication at a network entity is described. The code may include instructions executable by a processor to transmit, via a set of time-frequency resources, one or more CDS associated with a pseudo-random sequence, where the pseudo-random sequence and the set of time-frequency resources are indicated by an output of a PRF that is based on a timing parameter, a cell ID, and a shared key. The instructions may be further executable by the processor to communicate with a UE via a cell associated with the cell ID based on transmitting the one or more CDS via the set of time-frequency resources.

Some examples of the methods, apparatuses, and non-transitory computer-readable media described herein may further include operations, features, means, or instructions for acquiring absolute timing information via a global navigation satellite system (GNSS), where the timing parameter is based on the absolute timing information.

In some examples of the methods, apparatuses, and non-transitory computer-readable media described herein, transmitting the one or more CDS may include operations, features, means, or instructions for transmitting the one or more CDS via two or more carrier frequencies in accordance with a frequency hopping communication scheme.

In some examples of the methods, apparatuses, and non-transitory computer-readable media described herein, each cell of the network entity may be associated with a different pseudo-random cell ID.

Some examples of the methods, apparatuses, and non-transitory computer-readable media described herein may further include operations, features, means, or instructions for inputting, to the pseudo-random function, the shared key and a seed parameter that includes an absolute time bit sequence, frequency bit sequence, a PCID bit sequence, a time-specific parameterization bit sequence, or a combination thereof, where the output of the PRF indicates the pseudo-random sequence and the set of time-frequency resources.

Some examples of the methods, apparatuses, and non-transitory computer-readable media described herein may further include operations, features, means, or instructions for generating a pseudo-random cell ID for a cell of the network entity based on the shared key, a PCID of the cell, and a timestamp associated with generation of the pseudo-random cell ID, where the output of the PRF is based on the pseudo-random cell ID.

A method for wireless communication at a UE is described. The method may include transmitting a first message that indicates an ID of the UE and a first cryptographic number. The method may further include receiving, in response to the first message, a second message that indicates the ID of the UE, a first time interval, and a second cryptographic number. The method may further include performing a time calibration procedure based on the second message, a second time interval between reception of the second message and transmission of the first message, and a delay threshold of the UE.

An apparatus for wireless communication at a UE is described. The apparatus may include a processor, memory coupled with the processor, and instructions stored in the memory. The instructions may be executable by the processor to cause the apparatus to transmit a first message that indicates an ID of the UE and a first cryptographic number. The instructions may be further executable by the processor to cause the apparatus to receive, in response to the first message, a second message that indicates the ID of the UE, a first time interval, and a second cryptographic number. The instructions may be further executable by the processor to cause the apparatus to perform a time calibration procedure based on the second message, a second time interval between reception of the second message and transmission of the first message, and a delay threshold of the UE.

Another apparatus for wireless communication at a UE is described. The apparatus may include means for transmitting a first message that indicates an ID of the UE and a first cryptographic number. The apparatus may further include means for receiving, in response to the first message, a second message that indicates the ID of the UE, a first time interval, and a second cryptographic number. The apparatus may further include means for performing a time calibration procedure based on the second message, a second time interval between reception of the second message and transmission of the first message, and a delay threshold of the UE.

A non-transitory computer-readable medium storing code for wireless communication at a UE is described. The code may include instructions executable by a processor to transmit a first message that indicates an ID of the UE and a first cryptographic number. The instructions may be further executable by the processor to receive, in response to the first message, a second message that indicates the ID of the UE, a first time interval, and a second cryptographic number. The instructions may be further executable by the processor to perform a time calibration procedure based on the second message, a second time interval between reception of the second message and transmission of the first message, and a delay threshold of the UE.

In some examples of the methods, apparatuses, and non-transitory computer-readable media described herein, performing the time calibration procedure may include operations, features, means, or instructions for determining that a duration of the second time interval is less than a summation of the delay threshold and a duration of the first time interval.

In some examples of the methods, apparatuses, and non-transitory computer-readable media described herein, performing the time calibration procedure may include operations, features, means, or instructions for updating one or more time settings of the UE based on a timestamp associated with transmission of the second message and a timestamp associated with reception of the second message.

In some examples of the methods, apparatuses, and non-transitory computer-readable media described herein, performing the time calibration procedure may include operations, features, means, or instructions for refraining from performing a timing adjustment based on determining that a duration of the second time interval is greater than a summation of the delay threshold and a duration of the first time interval, where the first time interval corresponds to a duration between transmission of the second message and reception of the first message.

In some examples of the methods, apparatuses, and non-transitory computer-readable media described herein, receiving the second message may include operations, features, means, or instructions for receiving an indication of an absolute time associated with transmission of the second message, a subframe associated with transmission of the second message, or both, where performing the time calibration procedure is based on the indication.

In some examples of the methods, apparatuses, and non-transitory computer-readable media described herein, the first message includes a physical uplink shared channel (PUSCH) transmission that is scrambled using a first pseudo-random sequence and the second message includes a physical downlink shared channel (PDSCH) transmission that is scrambled using a second pseudo-random sequence.

In some examples of the methods, apparatuses, and non-transitory computer-readable media described herein, performing the time calibration procedure may include operations, features, means, or instructions for determining that a product of a scaling factor and a duration of the first time interval is less than the delay threshold, where the scaling factor is based on an error rate associated with a local oscillator of the UE.

In some examples of the methods, apparatuses, and non-transitory computer-readable media described herein, performing the time calibration procedure may include operations, features, means, or instructions for performing a time adjustment based on a timestamp associated with transmission of the second message and a timestamp associated with reception of the second message.

Some examples of the methods, apparatuses, and non-transitory computer-readable media described herein may further include operations, features, means, or instructions for transitioning from an unsynchronized timing (NT) state to a synchronized timing (T) state after performing the time calibration procedure, where the UE initiates the time calibration procedure in response to entering the NT state.

A method for wireless communication at a network entity is described. The method may include receiving a first message that indicates an ID of a UE and a first cryptographic number. The method may further include performing an authentication procedure based on using the ID of the UE to retrieve credential information associated with the UE. The method may further include transmitting, in response to the first message and based on a result of the authentication procedure, a second message that indicates the ID of the UE, a time interval, and a second cryptographic number.

An apparatus for wireless communication at a network entity is described. The apparatus may include a processor, memory coupled with the processor, and instructions stored in the memory. The instructions may be executable by the processor to cause the apparatus to receive a first message that indicates an ID of a UE and a first cryptographic number. The instructions may be further executable by the processor to cause the apparatus to perform an authentication procedure based on using the ID of the UE to retrieve credential information associated with the UE. The instructions may be further executable by the processor to cause the apparatus to transmit, in response to the first message and based on a result of the authentication procedure, a second message that indicates the ID of the UE, a time interval, and a second cryptographic number.

Another apparatus for wireless communication at a network entity is described. The apparatus may include means for receiving a first message that indicates an ID of a UE and a first cryptographic number. The apparatus may further include means for performing an authentication procedure based on using the ID of the UE to retrieve credential information associated with the UE. The apparatus may further include means for transmitting, in response to the first message and based on a result of the authentication procedure, a second message that indicates the ID of the UE, a time interval, and a second cryptographic number.

A non-transitory computer-readable medium storing code for wireless communication at a network entity is described. The code may include instructions executable by a processor to receive a first message that indicates an ID of a UE and a first cryptographic number. The instructions may be further executable by the processor to perform an authentication procedure based on using the ID of the UE to retrieve credential information associated with the UE. The instructions may be further executable by the processor to transmit, in response to the first message and based on a result of the authentication procedure, a second message that indicates the ID of the UE, a time interval, and a second cryptographic number.

In some examples of the methods, apparatuses, and non-transitory computer-readable media described herein, transmitting the second message may include operations, features, means, or instructions for transmitting an indication of a pseudo-random key to use for encrypting subsequent messages between the UE and the network entity.

In some examples of the methods, apparatuses, and non-transitory computer-readable media described herein, performing the authentication procedure may include operations, features, means, or instructions for obtaining a shared key based on the credential information associated with the UE.

In some examples of the methods, apparatuses, and non-transitory computer-readable media described herein, performing the authentication procedure may include operations, features, means, or instructions for validating a cryptographic signature of the first message based on the shared key.

Some examples of the methods, apparatuses, and non-transitory computer-readable media described herein may further include operations, features, means, or instructions for exchanging one or more messages with the UE to acquire a shared key prior to receiving the first message.

DETAILED DESCRIPTION

Figure 1:
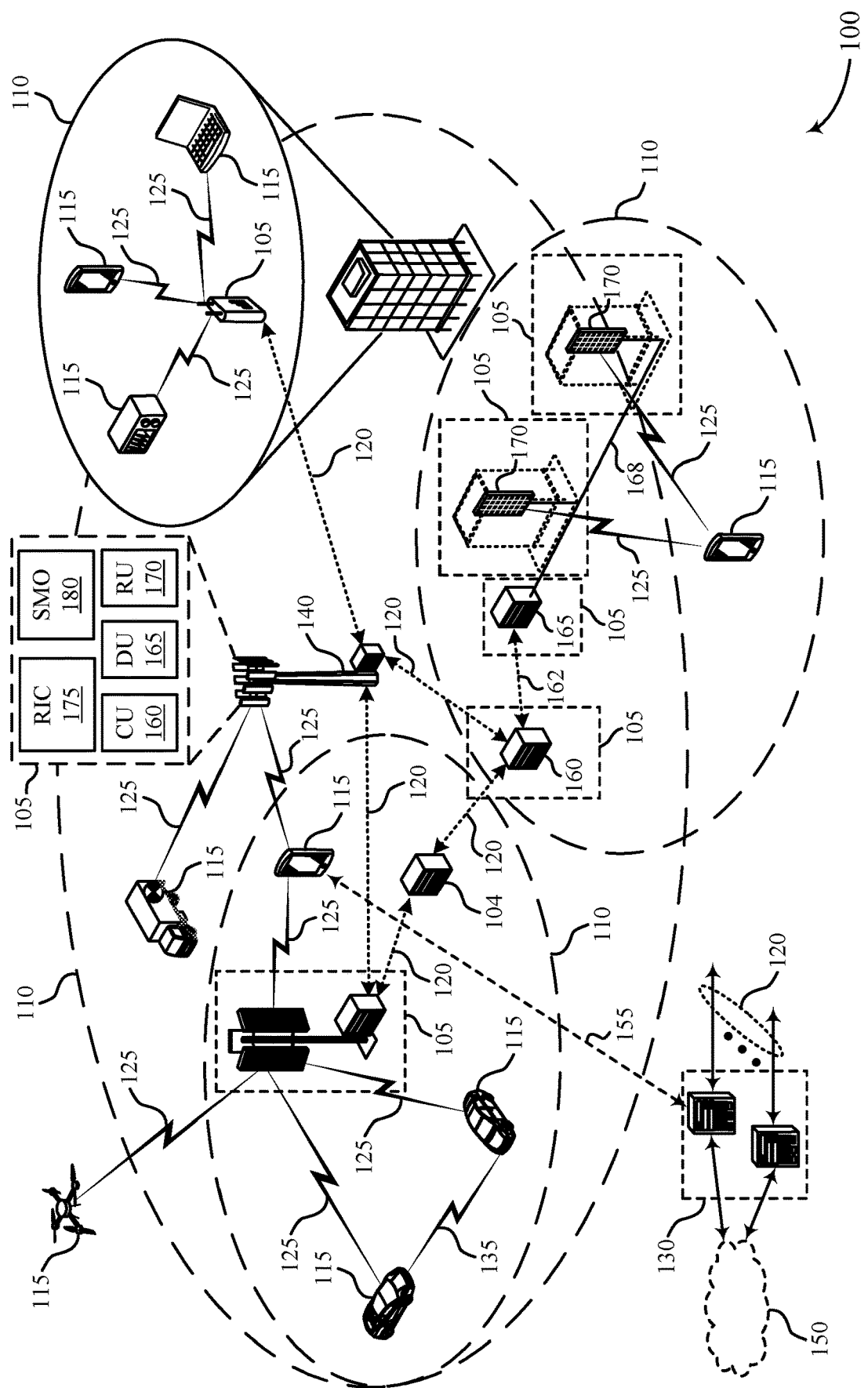
FIGS. 1 and 2 illustrate examples of wireless communications systems that support timing and synchronization techniques for secure networks in accordance with one or more aspects of the present disclosure.

Wireless communications may be used in a variety of secure networks such as military systems, law enforcement systems, critical industrial applications, and other tactical networks with relatively high security requirements. Synchronization and timing mechanisms used in some wireless communications systems may be unsuitable for tactical networks (also referred to as secure networks), as these networks may be more susceptible to external threats like denial of service (DoS) attacks, eavesdropping attacks, replay attacks, etc. For example, an attacking device may attempt to jam communications between a user equipment (UE) and a network entity in a secure network by injecting noise into a target frequency range, thereby reducing the likelihood of the UE successfully communicating with the network entity in the target frequency range.

An attacking device (equivalently referred to as an attacker, a threat agent, or a threat actor) may also attempt to impersonate a network entity such that a UE connects to (and shares data with) the attacking device. Additionally, or alternatively, the attacking device may use radio equipment to observe signals and extract information (such as device location or general activity levels) from the observed signals. Some attacking devices may also use replay attacks to disrupt the timing of communications between two devices. For example, an attacking device may receive a signal from a UE at a first time and subsequently retransmit the signal to a network entity at a later time to introduce a delay between the UE and the network entity. Secure networks may have more stringent security regulations to prevent or otherwise mitigate such attacks. However, existing synchronization and cell acquisition procedures may not comply with these regulations.

Aspects of the present disclosure support techniques for acquiring timing information and cell information in a secure network. For timing acquisition, a UE may use a bootstrapping process that is less susceptible to replay attacks. To initiate the bootstrapping process, the UE may transmit a first message (e.g., a cryptographic challenge) to a network entity. The first message may indicate an identifier (ID) of the UE, a first time interval, and a first cryptographic number (e.g., a nonce). In response to the first message, the network entity may obtain credentials for the UE (e.g., from the core network) and respond with a second message (e.g., a cryptographic response). The second message may indicate the ID of the UE, a first time interval, and a second cryptographic number. The UE may determine whether the second message has been tampered with (e.g., by an attacking device) based on the information in the second message, a second time interval between transmission of the first message and reception of the second message, and a delay threshold of the UE.

After successfully acquiring timing information, the UE may initiate a secure cell acquisition procedure by making one or more calls to a pseudo-random function (PRF) that depends on a timing input (the previously acquired timing information), a cell ID, and a shared key. An output of the PRF may indicate a pseudo-random sequence and locations of one or more time-frequency resources (e.g., symbol locations and physical resource block (PRB) locations). Accordingly, the UE may monitor the one or more time-frequency resources for a cell detection signal (CDS) that indicates the pseudo-random sequence. Upon detecting the CDS, the UE may attach to a cell associated with the cell ID, thereby enabling the UE to perform cell acquisition in a secure manner.

Aspects of the present disclosure may be implemented to realize one or more of the following advantages. The described techniques may increase the reliability, security, and efficiency of timing and synchronization procedures between a UE and a network entity in a secure network. More specifically, the described techniques may reduce the risk of replay attacks, impersonation attacks, and jamming attacks disrupting communications between the UE and the network entity, which may result in greater communication reliability. Moreover, aspects of the present disclosure may enable the UE to perform cell acquisition and timing calibration without compromising the integrity of the secure network.

Aspects of the disclosure are initially described in the context of wireless communications systems, system diagrams, resource diagrams, communication timelines, and process flows. Aspects of the disclosure are further illustrated by and described with reference to apparatus diagrams, system diagrams, and flowcharts that relate to timing and synchronization techniques for secure networks.

FIG. 1 illustrates an example of a wireless communications system 100 that supports timing and synchronization techniques for secure networks in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115.

In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-*c*, F1-*u*), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor.

An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support timing and synchronization techniques for secure networks, as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling.

The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may refer to resources of one symbol period (e.g., a duration of one modulation symbol) and one subcarrier, in which case the symbol period and subcarrier spacing may be inversely related. The quantity of bits indicated by each RE may depend on the modulation scheme (e.g., the order of the modulation scheme, the coding rate of the modulation scheme, or both), such that a relatively higher quantity of REs (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames, each of which may have a specified duration of, for example, 10 milliseconds (ms). Each radio frame may be identified by a system frame number (SFN), which may range from 0 to 1023.

Each frame may include multiple consecutively-numbered subframes or slots, and each subframe or slot may have the same duration. In some examples, a frame may be divided (e.g., in the time-domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time-domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115.

For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In accordance with aspects of the present disclosure, a UE 115 may monitor a set of time-frequency resources for one or more CDS associated with a pseudo-random sequence. The set of time-frequency resources and the pseudo-random sequence may be indicated by an output of a PRF that is based on a timing parameter, a cell ID, and a shared key. The UE 115 may communicate with a network entity 105 via a cell associated with the cell ID based on monitoring the set of time-frequency resources for the one or more CDS.

Additionally, or alternatively, the UE 115 may transmit a first message that indicates an ID of the UE 115 and a first cryptographic number. The UE 115 may receive, in response to the first message, a second message indicating the ID of the UE 115, a first time interval, and a second cryptographic number. The UE 115 may perform a time calibration procedure based on the second message, a second time interval between reception of the second message and transmission of the first message, and a delay threshold of the UE 115.

Aspects of the wireless communications system 100 may be implemented to realize one or more of the following advantages. The techniques described with reference to FIG. 1 may enable a UE 115 and a network entity 105 to communicate with greater security, reduced interference, and improved reliability, among other benefits. For example, the timing and synchronization procedures described herein may enable one or both of the UE 115 and the network entity 105 to mitigate jamming attacks, impersonation attacks, replay attacks, and eavesdropping attacks from external devices, which may increase the likelihood of successful communications between the UE 115 and the network entity 105.

Figure 2:
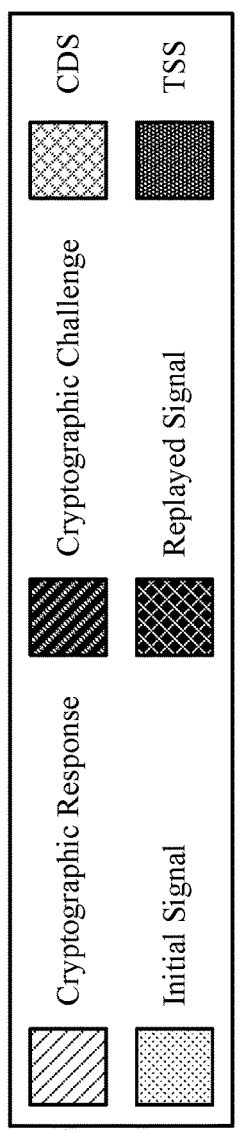
Figure 2:
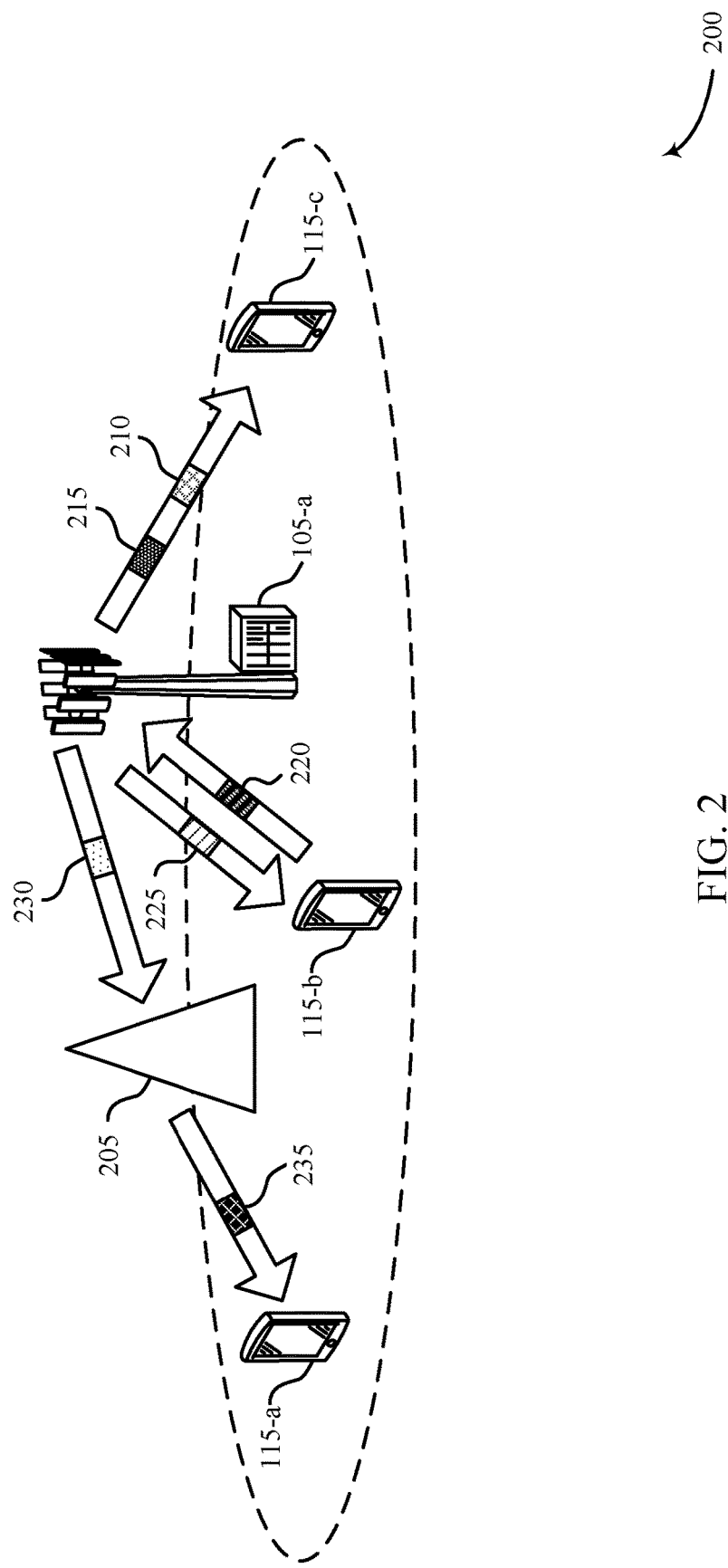

FIG. 2 illustrates an example of a wireless communications system 200 that supports timing and synchronization techniques for secure networks in accordance with one or more aspects of the present disclosure. The wireless communications system 200 may implement or be implemented by aspects of wireless communications system 100. For example, the wireless communications system 200 may include a UE 115-*a*, a UE 115-*b*, a UE 115-*c*, and a network entity 105-*a*, which may be examples of corresponding devices described with reference to FIG. 1. The wireless communications system 200 (a tactical or high-security network) may also include an attacking device 205 (equivalently referred to as a jamming or eavesdropping device) that attempts to monitor or disrupt communications between the network entity 105-*a* and the UEs 115.

The wireless communications system 200 may be an example of a secure or tactical network deployed in hostile territory (such as a base or conflict zone) with a buffer zone between the secure network and other networks. The secure network depicted in the example of FIG. 2 may be employed by a military organization in a hostile environment where hostile forces are attempting to disrupt the network or observe network behavior to extract pertinent information. The wireless communications system 200 may include various devices commissioned or deployed by the military organization, such as the UEs 115 and the network entity 105-*a*.

In some cases, the attacking device 205 may impersonate the network entity 105-*a* by replaying (retransmitting) signals from the network entity 105-*a*. Communications between the network entity 105-*a* and the UEs 115 may also be susceptible to sequence-specific jamming. To mitigate such jamming, the network entity 105-*a* may transmit signals to the UEs 115 using a wider bandwidth or different frequencies (e.g., in accordance with a frequency hopping scheme). Using wider bandwidths and frequency hopping schemes may reduce the likelihood of jamming and signal detection. Additionally, or alternatively, the network entity 105-*a* may transmit signals using a spreading sequence (e.g., a scrambling sequence, a spreading sequence, or a frequency hopping sequence) that is cryptographically secure.

In a replay attack, the attacking device 205 may receive a signal 230 from the network entity 105-*a* at a first time and transmit a signal 235 (a replay of the signal 230) to the UE 115-*a* at a later time, thereby disrupting the timing of communications between the UE 115-*a* and the network entity 105-*a*. In other words, the signal 235 from the attacking device 205 may introduce a timing error between the UE 115-*a* and the network entity 105-*a*. In some examples, the UEs 115 and the network entity 105-*a* may deter or mitigate replay attacks by performing an initial handshake procedure (as described with reference to FIGS. 8 and 9) to ensure that both devices are synchronized in time.

For example, the UE 115-b may transmit an indication of a cryptographic challenge 220 to the network entity 105-a. Upon receiving the cryptographic challenge 220 from the UE 115-b, the network entity 105-a may retrieve credentials for the UE 115-b (via the core network) and obtain a shared key to use for encryption of subsequent messages between the network entity 105-a and the UE 115-b. The network entity 105-a may then transmit a cryptographic response 225 to the UE 115-b. The UE 115-b may determine whether the cryptographic response 225 is valid (e.g., whether the message has been tampered with) based on an error tolerance, a time duration between transmission of the cryptographic challenge 220 and reception of the cryptographic response 225, and timing information in the cryptographic response 225. If the UE 115-b determines that the cryptographic response 225 is valid, the UE 115-b may acquire absolute timing based on the timing information in the cryptographic response 225.

The UEs 115 may also acquire absolute timing information by receiving and measuring a timing synchronization signal (TSS) 215 from the network entity 105-a. The TSS 215 may help reduce the timing uncertainty of the UEs 115 when the UEs 115 have acquired approximate timing information (e.g., with an error of less than 100 ms). Additionally, or alternatively, the UEs 115 may acquire absolute timing information via time-domain synchronization or a global navigation satellite system (GNSS). Once the UEs 115 have acquired this information, the UEs 115 may perform a synchronization procedure to identify a cell of the network entity 105-a. More specifically, the UEs 115 may identify a cell ID associated with the network entity 105-a by monitoring one or more pseudo-random time-frequency resources (e.g., symbols and PRBs) for a CDS 210.

In some examples, the wireless communications system 200 may be associated with a high signal-to-noise ratio (SNR). To reduce the adverse effects of jamming in such scenarios, the UEs 115 and the network entity 105-a may use frequency hopping and randomization. In other examples, the UEs 115 may use a bootstrapping mechanism (described with reference to FIGS. 8 and 9) to acquire timing information and encryption keys via jamming-resilient communications associated with a relatively low data rate. The UEs 115 may use the bootstrapping mechanism when jamming or attacking devices are present in the wireless communications system 200.

The UEs 115 may use bootstrapping when the attacking device 205 is able to determine or identify the time-frequency resources used for communications between the UEs 115 and the network entity 105-a. The bootstrapping sub-system described herein may employ low data rate communications to reduce the impact of jamming. The UEs 115 may access the bootstrapping sub-system (without prior timing information) using UE-specific credentials provided via a universal subscriber identity module (SIM) or other means. Once the UEs 115 have obtained timing information and encryption keys, the UEs 115 may securely communicate with the network entity 105-a.

The operating mode of the UEs 115 may vary based on whether the UEs 115 have successfully completed the bootstrapping process. For example, when the UE 115-c is without timing information (e.g., when the UE 115-c is in a no timing (NT) state), the UE 115-c may acquire timing information before accessing the network. The UE 115-c may acquire timing via different mechanisms (e.g., bootstrapping, TSS, GNSS). If, however, the UE has already acquired timing (e.g., if the UE is in a timing (T) state), the UE 115-c may search for a cell ID of the network entity 105-a and initiate a user plane connection with the network entity 105-a by monitoring for the CDS 210. In some cases, the UE 115-c may transition between the NT state (an unsynchronized state) and the T state (a synchronized state).

For example, if the UE 115-c is unable to find a cell for a time period (resulting in a loss of synchronization), the UE 115-c may revert to the NT state. The UE 115-c may transition to the NT state based on other conditions or triggers (e.g., radio link failure). The complexity of the bootstrapping sub-system may be based on various operational conditions. In some deployments, the bootstrapping sub-system may only be available within a designated area. In such cases, the UE 115-c may move to the designated area to acquire timing information (thereby reducing the complexity of the bootstrapping sub-system). In other cases, if the UE 115-c enters an NT state in the field (e.g., relatively far away from the designated area), more complex bootstrapping sub-system implementations may be used.

Figure 3:
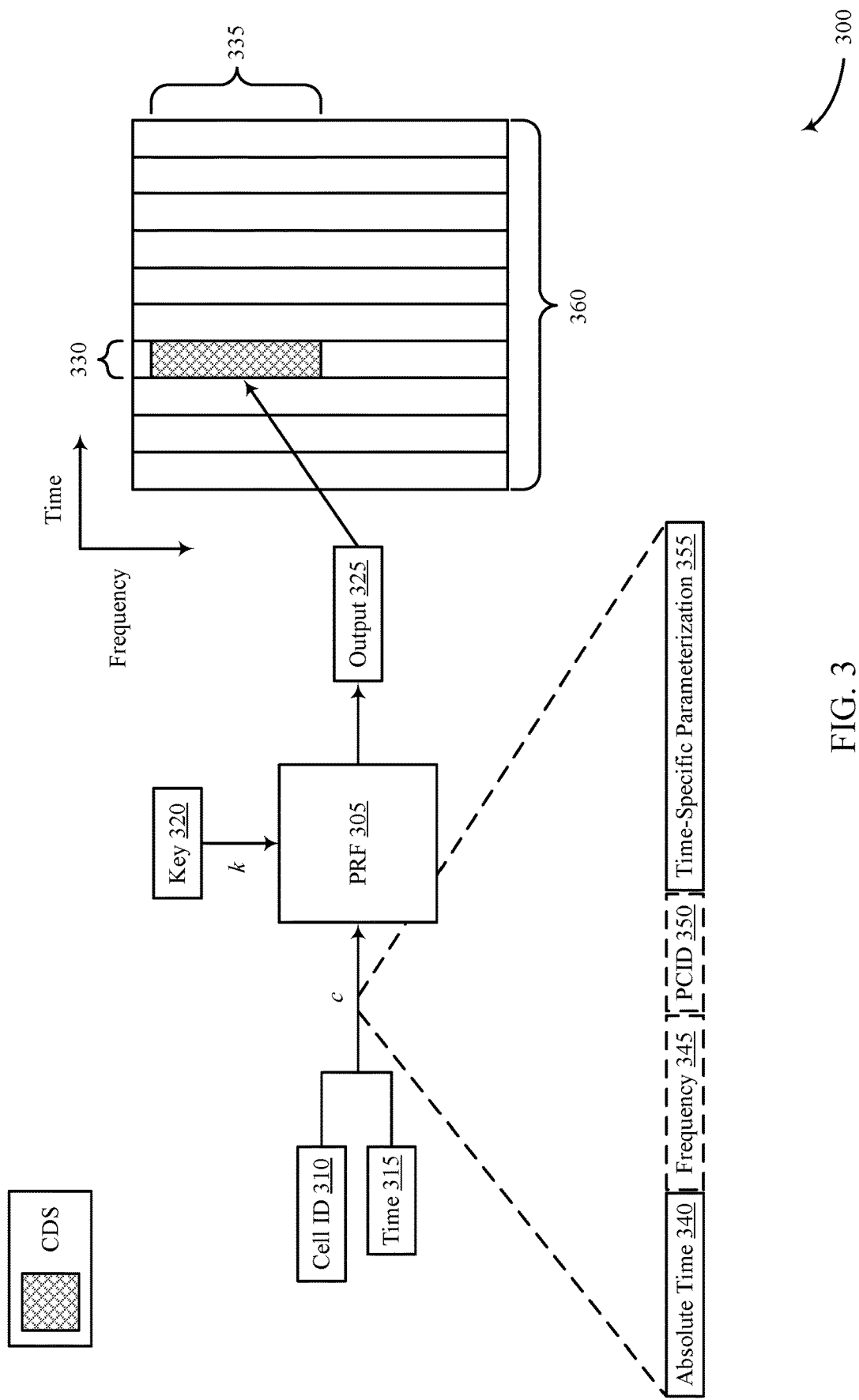
FIG. 3 illustrates an example of a system diagram that supports timing and synchronization techniques for secure networks in accordance with one or more aspects of the present disclosure.

FIG. 3 illustrates an example of a system diagram 300 that supports timing and synchronization techniques for secure networks in accordance with one or more aspects of the present disclosure. The system diagram 300 may implement or be implemented by aspects of the wireless communications system 100 or the wireless communications system 200. For example, the system diagram 300 may be implemented by a UE 115, as described with reference to FIGS. 1 and 2. The system diagram 300 may include a CDS, which may be an example of the CDS 210 described with reference to FIG. 2. In the system diagram 300, a UE may monitor a set of time-frequency resources for a pseudo-random sequence based on an output of a PRF 305.

In the example of FIG. 3, a UE in a secure (tactical) network may input a cell ID 310, a timing parameter 315, and a shared key 320 into the PRF 305. The UE may monitor a symbol 330 and a PRB 335 for the CDS based on an output 325 of the PRF 305. The UE may have access to a shared key 320 that is used to derive common randomness via the PRF 305. The shared key 320 may be unknown to attackers, and may be periodically refreshed. Devices in the secure network may be synchronized in time (e.g., using GNSS, TSS, the bootstrapping sub-system, or some other mechanism). The UE may be configured with a set of channels (e.g., frequencies) on which cells can be found.

In some examples, the UE may obtain synchronization by measuring one or more synchronization signals (CDS and TSS). These synchronization signals may have characteristics that deter or reduce the likelihood of attacks from other devices. To mitigate replay attacks and DoS attacks, a pseudo-random sequence indicated by the synchronization signals may change over time. The synchronization signals may be transmitted at pseudo-random time-frequency instants to mitigate burst jamming. The synchronization signals may be transmitted using relatively larger bandwidths or frequency hopping to reduce the impact of narrowband jamming.

In some examples, two network entities may be configured to use different pseudo-random sequences. If the UE is without accurate timing information, the UE may perform a time-domain search using a configured sequence. In some examples, the synchronization signals may have a periodicity of 20 ms. In such examples, the UE may test (use) a hundred different sequences if the timing uncertainty of the UE is on the order of 1 second (+/−). In some examples, if the UE is using a narrowband radio frequency for time-domain search, the UE may be unable to use frequency hopping (since the UE and the network may be using different frequency hopping configurations). Using a fixed frequency location may increase the adverse effects of narrowband jamming.

The UE may use the CDS to find a cell ID (when timing and frequency are known). When this information is known, the CDS may not be limited to the narrowband search processes used for primary synchronization signal (PSS) and secondary synchronization signal (SSS) acquisition. The UE may be preconfigured with a CDS periodicity (e.g., every 10 ms). The UE may compute a pseudo-random sequence for the corresponding time interval 360 based on the cell ID 310 and other input parameters. If the UE performs an exclusive or (XOR) Boolean operation on the cell ID 310 and the pseudo-random sequence, an attacker may recover the cell ID 310 by XOR-ing multiple cells together. The pseudo-random sequence may be used to determine the sequence (e.g., using quadrature phase shift keying). Additionally, or alternatively, the pseudo-random sequence may be used to determine the time-domain and frequency-domain locations within the time interval 360 (e.g., 10 ms). The UE may determine such locations based on one or more constraints (e.g., a TDM configuration). If frequency hopping is used, multiple time or frequency starting points may be obtained from the PRF 305.

In some cases, a subcarrier spacing of the CDS may be 15 kHz. The CDS may span 14 PRBs (336 bits). There may be 140 possible symbol locations (7.13 bits). The starting PRB may range from PRB 0 to PRB 35 (5.12 bits). Thus, the UE may make 3 calls to the PRF 305 to obtain 384 bits. In some cases, more bits may be used (e.g., for repetitions and frequency hopping across repetitions). If the CDS is a one-step or one-shot detection signal, the UE may test up to 1,005 cell ID hypotheses for the CDS. The UE may execute 3 PRF calls for each cell ID. The UE may perform a frequency-domain correlation of 168 REs. In some examples, the UE may search within a limited time-domain window (to account for propagation delay). In some cases, the UE may reduce the number of hypotheses by using approximate position location, pre-configuration, or some combination thereof. The overall complexity of CDS detection may be reduced by splitting the CDS into a primary CDS (P-CDS) and a secondary CDS (S-CDS), similar to PSS and SSS.

Additionally, or alternatively, the number of cell IDs may be reduced. Using fewer cell groups (e.g., 15 cell groups, identified by cell ID mod 15) may be unsecure, as the same set of cells may transmit the same signal with a periodicity that corresponds to the subcarrier spacing of the CDS. The security of such processes may be improved by randomizing cell groups over time. Subsequently, the UE may compute an output of the PRF 305. For example, the UE may obtain time, frequency, and sequence locations based on the time or cell group. After computing the output of the PRF, the UE may search for the corresponding signals (e.g., 15 signals for 15 cell groups) and select a quantity of cell groups (e.g., 2 cell groups) with the highest detected signal correlation. After this selection, the UE may compute a PRF output for each cell in the selected groups. In some examples, there may be a total of 67 cell IDs per cell group. The P-CDS and S-CDS may be TDM-ed to avoid buffering (e.g., the P-CDS and the S-CDS may be separated by at least 1 ms). For example, the UE may divide a CDS periodicity (e.g. 20 ms) into 2 segments (e.g., 10 ms segments) and refrain from using the center 1 ms.

In some examples, the network entity may randomize cell groups (e.g., to increase security). When randomizing the cell groups, the network entity may create an invertible randomized cell ID that depends on a current time. For example, a randomized cell ID at a given time may be a pseudo-random permutation that depends on an actual cell ID and a parameter $rN_{ID}=f(N_{ID}, t; k)$, where t denotes a slot, an SFN, a coordinated universal time (UTC), or any other timing parameter 315, k represents the shared key 320, and $rN_{ID}$ refers to the current time. In some cases, the UE may obtain the pseudo-random sequence by calling the PRF 305 and XOR-ing a quantity of least significant bits (LSBs) in the binary output with the cell ID 310. In some cases, if nearby cells are configured with different randomized cell IDs, the network entity may generate pseudo-random permutations accordingly.

In some examples, 3 sectors of the same network entity may use different cell IDs. The network entity may configure respective cell IDs for each sector according to the equation $N_{ID,1}=N_{ID}$ mod 3, $N_{ID,2}=N_{ID}$ div 3, $rN_{ID}=3f(N_{ID,1}, t; k)+N_{ID,2}$. Different sectors (cells) of the same network entity may have the same $N_{ID,2}$ and a different $N_{ID,1}$. This mechanism may be extended to any number of cells (e.g., to prevent collisions between adjacent cells, the network may increase the value of 3 to a different value).

In some examples, the network entity may generate a seed (or counter), which may be denoted as c. The seed may be based on the cell ID 310 and the timing parameter 315. The PRF 305 may take (as inputs) the shared key 320 (e.g., a key of any length) and the seed (e.g., a seed or counter of 128 bits). In some examples the PRF 305 may take other inputs specified by advanced encryption standard (AES) or other cyphering mechanisms. The PRF 305 may produce a sequence of bits (e.g., 128 bits) in an output 325. A different seed may be used for each channel or signal that is generated. If the seed is reused, the PRF output may be the same, which may compromise the security of the system. Thus, the seed may be computed for each channel or signal.

In some examples, the 128-bit seed may be divided into multiple parts. For example, the 128-bit seed may be divided into a specified number of bits (denoted by T) for an absolute time 340 (e.g., a division of 1000 ms) and specified number of bits (M) for a time-specific parameterization 355 (e.g., a 1000 ms-specific parameterization). For the M bits, devices may generate randomness at different scales. Common randomness across 1000 ms (e.g., for a timing recovery signal) may result in one option (e.g., hypothesis, path, bucket). Common randomness across 10 ms (e.g., for the location of a CDS) may result in 100 options. There may be no common randomness per subframe. Common randomness per slot (e.g., for subcarrier spacings up to 120 kHz) may result in 8000 options. When the total number of options is less than 8192 (13 bits), devices may be configured with a mapping.

The UE may determine the number of blocks per option such that the number is less than $2^{20}$ blocks per option ($2^{27}$ bits per option or 134 Mb per option). Further divisions (e.g., blocks for demodulation reference signal (DMRS), physical downlink shared channel (PDSCH), synchronization) may also be supported. The division of the 128-bit seed may include 27 bits per block in a given option, 13 bits per option, and 88 bits for the absolute time 340 in seconds (which may wrap-around after $10^{18}$ years). The number of bits for the absolute time 340 can modified to support additional options or blocks per option. In some cases, the cell ID 310 may be embedded in each option. Alternatively, the cell ID 310 may be a separate field.

The shared key 320 (which may be pre-programmed) may be used for broadcast traffic and signals. However, the shared key 320 may also be modified to support unicast traffic and signals. In some cases, the shared key 320 may be used for broadcast traffic or signals to prevent physical downlink control channel (PDCCH) scrambling or frequency hopping (e.g., when the same CORESET is used for unicast and broadcast). In some cases, the shared key 320 may support multiple frequencies (carrier aggregation). In such cases, the PRF seed may include frequency information 345. In some examples, the UE may be configured with multiple different frequencies (e.g., 10 frequencies). In such examples, the PRF seed may include a physical cell ID (PCID) 350.

Figure 4:
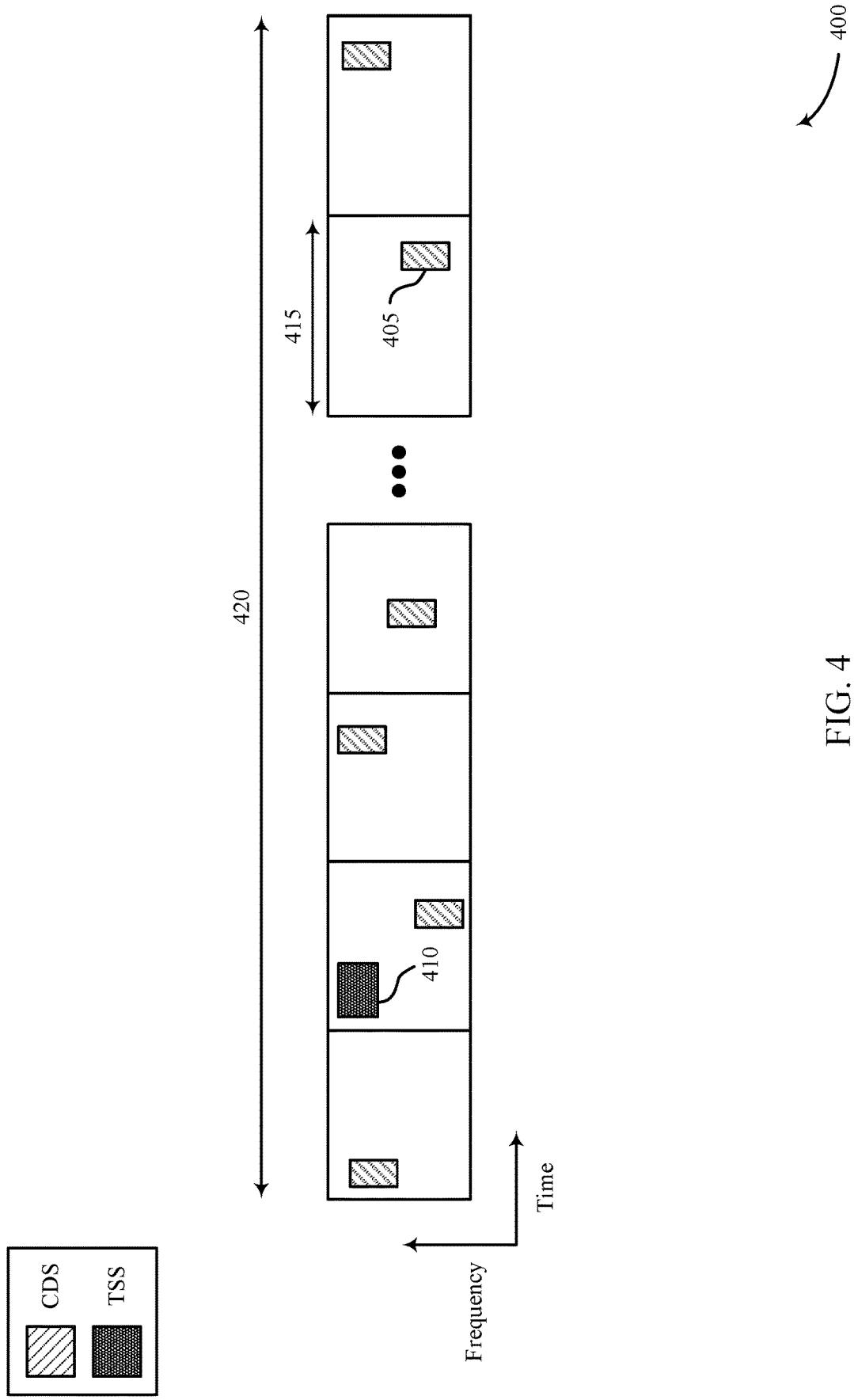
FIG. 4 illustrates an example of a resource diagram that supports timing and synchronization techniques for secure networks in accordance with one or more aspects of the present disclosure.

FIG. 4 illustrates an example of a resource diagram 400 that supports timing and synchronization techniques for secure networks in accordance with one or more aspects of the present disclosure. The resource diagram 400 may implement or be implemented by aspects of any of the wireless communications systems or system diagrams described with reference to FIGS. 1 through 3. For example, the resource diagram 400 may be implemented by a UE 115 or a network entity 105 described with reference to FIGS. 1 and 2. The resource diagram 400 may include a CDS 405, which may be an example of the CDS 210 described with reference to FIG. 2. The resource diagram 400 may also include a TSS 410, which may be an example of the TSS 215 described with reference to FIG. 2.

In the example of FIG. 4, a UE may perform timing and synchronization processes based on the CDS 405 and the TSS 410. A network entity may transmit the CDS 405 using pseudo-random time-frequency resources (symbols and PRBs). The CDS 405 may include or otherwise indicate a pseudo-random sequence. The network entity may transmit the CDS 405 within a time interval 415 (e.g., 10 ms). Likewise, the network entity may transmit the TSS 410 within a time interval 420 (e.g., 1 s).

The UE may use the TSS 410 to acquire more precise timing (e.g., after being disconnected from GNSS for a relatively long time). A configuration of the TSS 410 may be based on a maximum (threshold) time drift of the UE and a maximum complexity of the UE (in terms of simultaneous search). For example, if the maximum drift of the UE is +/−500 ms, the UE may generate a random value associated with a current time window of 1 s.

The random value may indicate a center frequency (e.g., PRBs), a time instant, and a pseudo-random sequence. The UE may search the identified time-frequency resources for the pseudo-random sequence, and may obtain timing information based on identifying the pseudo-random sequence (in the CDS 405). In some cases, all cells may transmit the same TSS 410 using the same time and frequency resources, which may introduce ambiguity and interference. To resolve these issues, the UE may be configured to monitor multiple TSSs (e.g., 3 TSSs), which may be in the same frequency range. In some examples, the TSS 410 may be designed for 1-shot detection.

Figure 5:
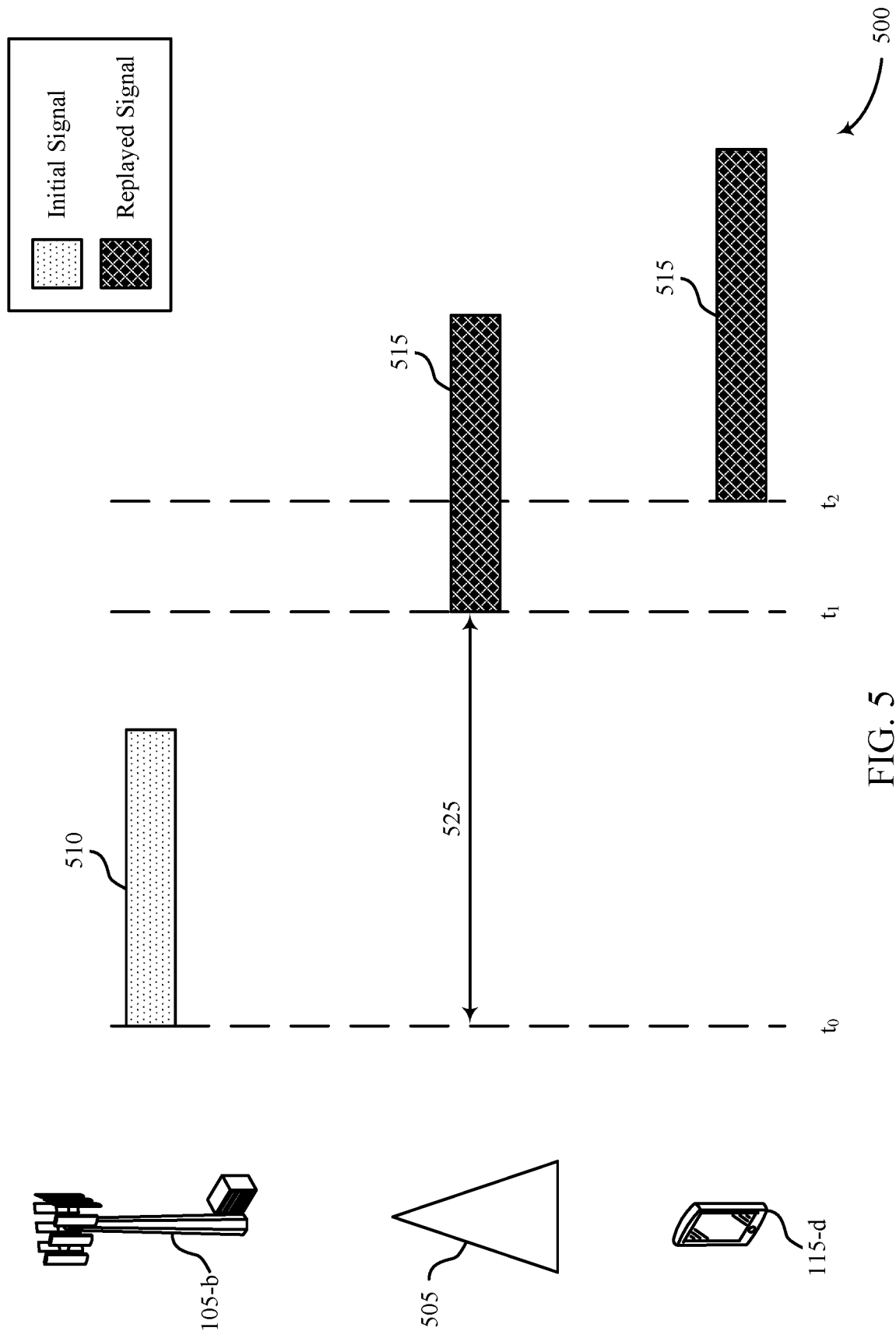
FIGS. 5 through 7 illustrate examples of communication timelines that support timing and synchronization techniques for secure networks in accordance with one or more aspects of the present disclosure.

FIG. 5 illustrates an example of a communication timeline 500 that supports timing and synchronization techniques for secure networks in accordance with one or more aspects of the present disclosure. The communication timeline 500 may implement or be implemented by aspects of any of the wireless communications systems, system diagrams, or resource diagrams described with reference to FIGS. 1 through 4. For example, the communication timeline 500 may include a UE 115-d and a network entity 105-b, which may be examples of corresponding devices described with reference to FIG. 1 and FIG. 2. The communication timeline 500 may also include an attacking device 505, which may be an example of the attacking device 205 described with reference to FIG. 2. The communication timeline 500 illustrates an example of a replay attack.

In the example of FIG. 5, The network entity 105-b may transmit a signal 510 to the UE 115-d at time $t_0$. The signal 510 may include timing information (e.g., this subframe starts at $t_0$). The attacking device 505 may capture the waveform of the signal 510 from the network entity 105-b. At time $t_1$ ($t_0+t_{attack}$), the attacking device 505 may transmit a replayed signal 515 to the UE 115-d.

The attacking device 505 may transmit the replayed signal 515 after a time delay 525 ($t_{attack}$) The time delay 525 may include the time required for the attacking device 505 to decode and re-encode the signal 510. The time delay 525 may also include any internal delay between components of the attacking device 505. The replayed signal 515 may include the timing information from the signal 510 (e.g., this subframe starts at $t_0$).

At time $t_2(t_0+t_{attack}+t_{prop})$, the UE 115-d may receive the replayed signal 515. The replayed signal 515 may be a time-shifted copy of the signal 510 with a propagation delay ($t_{prop}$). The timing information in the replayed signal 515 (e.g., this subframe starts at to) may introduce timing errors at the UE 115-d. For example, the UE 115-d may determine that the subframe starts at $t_2$ rather than to, thereby disrupting the timing of communications between the UE 115-d and the network entity 105-b.

The techniques and operations described with reference to FIG. 5 may enable the UE 115-d and the network entity 105-b to detect and mitigate replay attacks perpetrated by the attacking device 505. For example, the UE 115-d and the network entity 105-b may perform a handshake procedure (described with reference to FIGS. 8 and 9) to confirm that the UE 115-d and the network entity 105-b are aligned in time. If a delay (caused by the attacking device 505) is detected during the handshake procedure, the UE 115-d may enter an NT state and attempt to re-acquire accurate timing information via GNSS or TSS reception.

Figure 6:
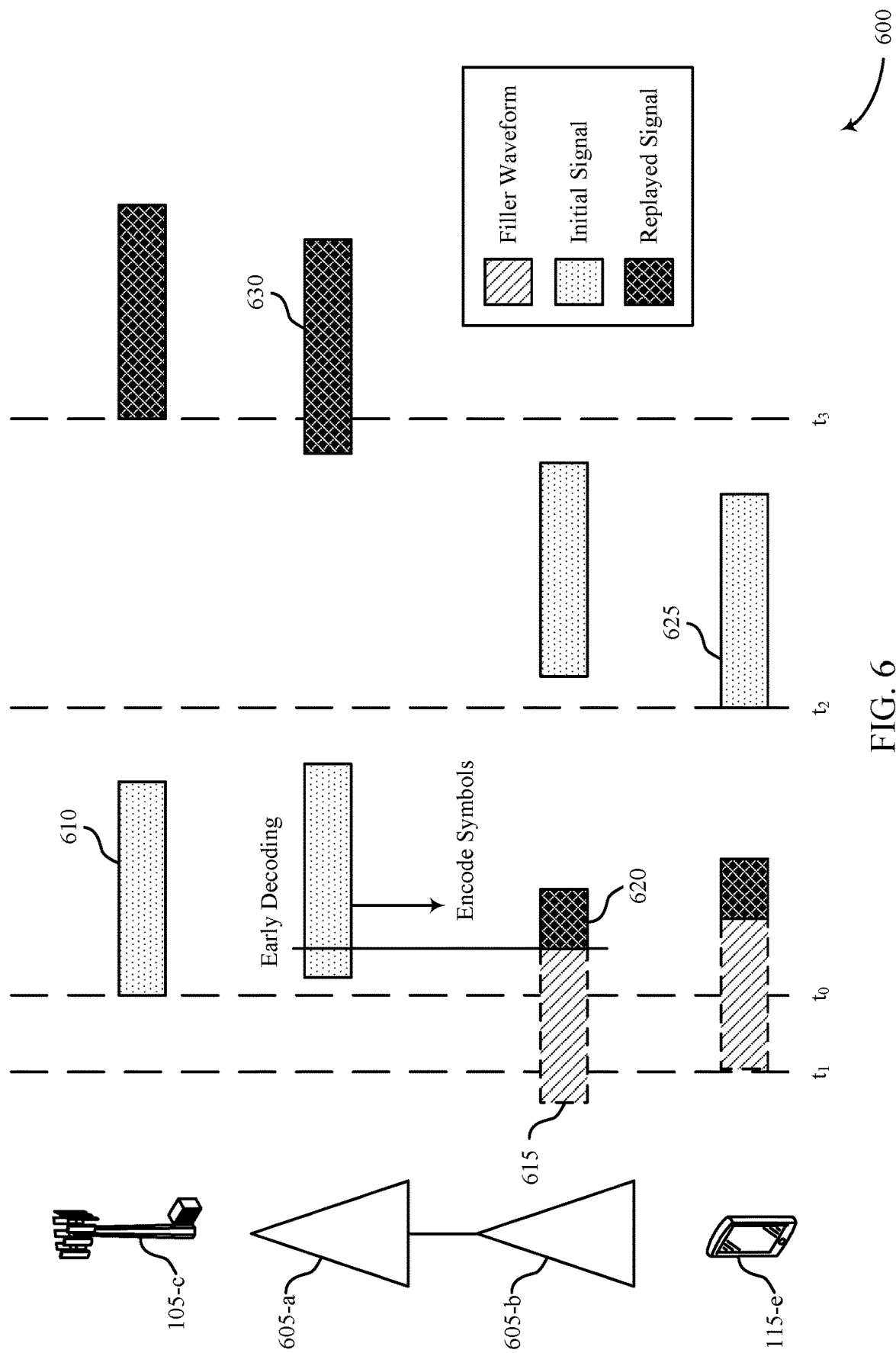

FIG. 6 illustrates an example of a communication timeline 600 that supports timing and synchronization techniques for secure networks in accordance with one or more aspects of the present disclosure. The communication timeline 600 may implement or be implemented by aspects of any of the wireless communications systems, system diagrams, or resource diagrams described with reference to FIGS. 1 through 5. For example, the communication timeline 600 may include a UE 115-e and a network entity 105-c, which may be examples of corresponding devices described with reference to FIGS. 1 through 5. The communication timeline 600 may also include attacking devices 605, which may be examples of the attacking device 205 described with reference to FIG. 2. An attacking device 605-a and an attacking device 605-b may be connected via one or more wired or wireless links.

If a transmission from the network entity 105-c has a relatively long time duration (e.g., for communications with relatively low data rates), the attacking device 605-a may perform early decoding on the transmission and perform a non-causal replayed transmission by re-encoding the decoded transmission. In some examples, the attacking devices 605 may introduce non-causality into a transmission from the network entity 105-c.

For example, the UE 115-e may receive a message that appears to be from the network entity 105-c before the network entity 105-c transmits the message. In other examples, the attacking devices 605 may introduce non-causality into a transmission from the UE 115-e to the network entity 105-c. For example, the network entity 105-c may receive a message that appears to be from the UE 115-e before the UE 115-e transmits the message.

In the example of FIG. 6, the network entity 105-c may transmit a signal 610 to the UE 115-e at time $t_0$. The attacking device 605-a may intercept the signal 610 and perform early decoding on the signal 610. Accordingly, the attacking devices 605 may re-encode a portion 620 of the intercepted signal (e.g., the last symbols of the signal 610). The attacking device 605-b may transmit a signal that includes a filler waveform 615 and the portion 620 of the signal 610 that was intercepted and re-encoded.

The attacking device 605-b may perform early termination of the filler waveform 615 and begin a non-causal re-transmission of the signal 610 thereafter. Starting at $t_1$, the UE 115-e may receive the filler waveform 615 and the re-encoded portion 620 of the signal 610 from the attacking devices 605. Accordingly, the UE 115-e may acquire incorrect timing information due to the delay caused by the attacking devices 605. The maximum timing error in such scenarios may be denoted by $T_{max}+(t_0+t_1)$.

Additionally, or alternatively, the UE 115-e may transmit a signal 625 at time $t_2$. The attacking device 605-b may intercept the signal 625 from the UE 115-e, perform early decoding on the signal 625, and re-encode the decoded portion of the signal 625. Accordingly, the attacking device 605-a may transmit a signal 630 that includes the decoded (and subsequently re-encoded) portion of the signal 625. The network entity 105-c may begin receiving the signal 630 at time $t_3$, thereby introducing further delay between the UE 115-e and the network entity 105-c.

The techniques described herein may enable the UE 115-e and the network entity 105-c to detect and mitigate replay attacks perpetrated by the attacking devices 605. For example, the UE 115-e and the network entity 105-c may perform a handshake procedure (described with reference to FIGS. 8 and 9) to confirm that the UE 115-e and the network entity 105-c are aligned in time. If a delay (caused by the attacking devices 605) is detected during the handshake procedure, the UE 115-e may enter an NT state and attempt to re-acquire accurate timing information via GNSS or TSS reception.

Figure 7:
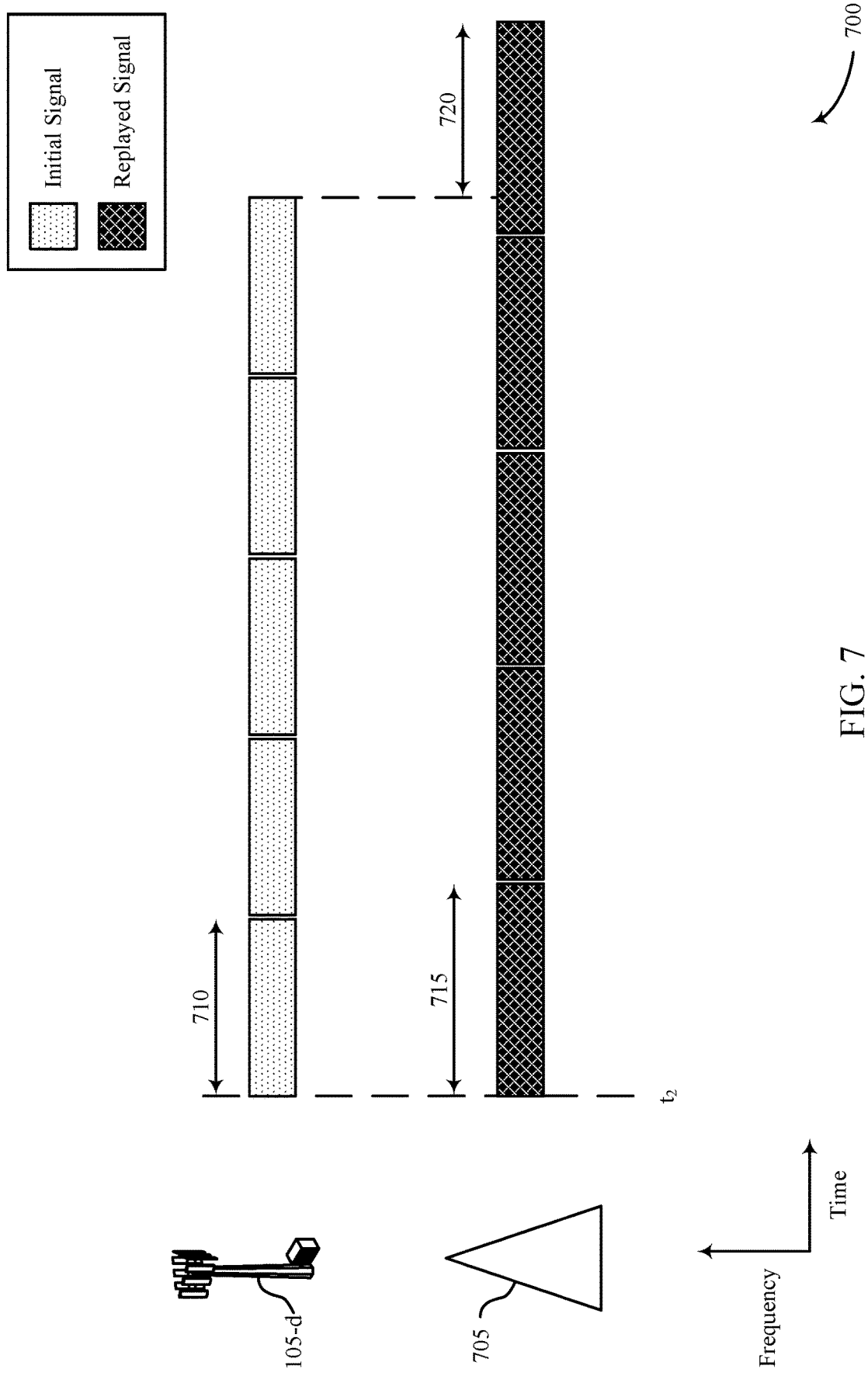

FIG. 7 illustrates an example of a communication timeline 700 that supports timing and synchronization techniques for secure networks in accordance with one or more aspects of the present disclosure. The communication timeline 700 may implement or be implemented by aspects of any of the wireless communications systems, system diagrams, resource diagrams, or communication timelines described with reference to FIGS. 1 through 6. For example, the communication timeline 700 may include a network entity 105-d, which may be an example of the network entity 105-c described with reference to FIG. 6. The communication timeline 700 may also include an attacking device 705, which may be an example of corresponding devices described with reference to FIGS. 2 through 6.

In the example of FIG. 7, the network entity 105-d may begin transmitting a signal at time $t_2$. The signal (also referred to as a message or transmission) may span a time duration 710. In some cases, the attacking device 705 may introduce a timing error by re-transmitting the signal for a time duration 715 that is longer than the time duration 710. The time duration 720 illustrates the accumulated error between the original transmission from the network entity 105-d and the subsequent re-transmission from the attacking device 705.

If a local oscillator of a UE has an error on the order of +/− X parts per million (PPM), there may be an initial timing error of up to (1+2X) between the UE and the network entity 105-d. If X is relatively small, the UE may be capable of acquiring timing information with sufficient accuracy. If the UE detects a timing or frequency error larger than 2X, the UE may determine that the attacking device 705 is tampering with communications between the UE and the network entity 105-d.

To mitigate replay attacks from the attacking device 705, a limit may be imposed on the maximum time between $t_1$ (a time associated with reception of reception of a cryptographic challenge and $t_2$ (a time associated with transmission of a cryptographic response), as this time duration can be scaled by up to (1+2X) by the attacking device 705.

In some cases, however, the attacking device 705 may introduce a continuous drift that accumulates over time (e.g., the time duration 720), which may cause the UE to drift from the timing of the network entity 105-d. The UE may periodically confirm (re-establish) timing with the network entity 105-d by repeating the techniques and operations described with reference to FIGS. 8 and 9, which may reduce the likelihood of timing misalignment between the UE and the network entity 105-d.

Figure 8:
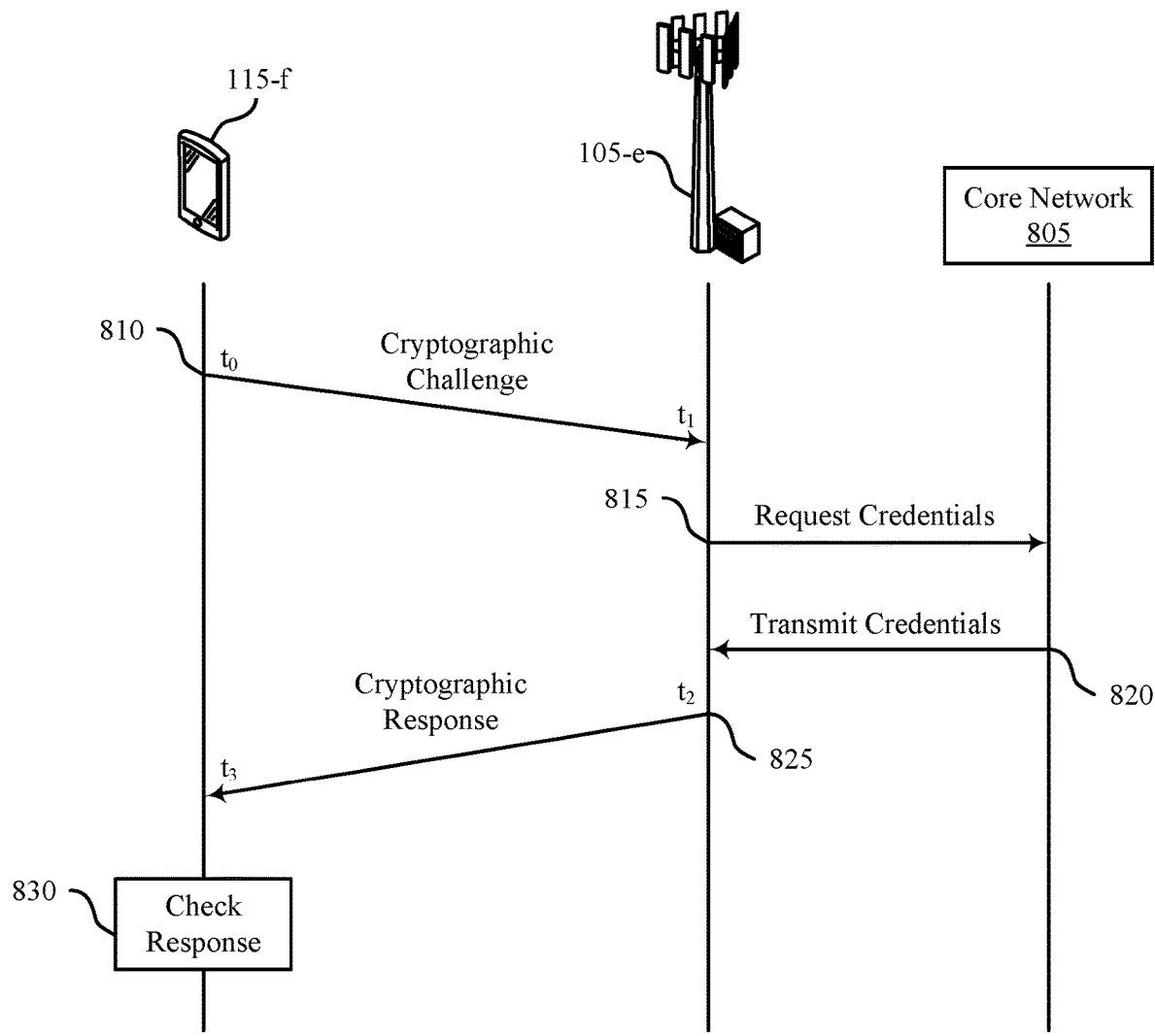
FIGS. 8 and 9 illustrate examples of process flows that support timing and synchronization techniques for secure networks in accordance with one or more aspects of the present disclosure.

FIG. 8 illustrates an example of a process flow 800 that supports timing and synchronization techniques for secure networks in accordance with one or more aspects of the present disclosure. The process flow 800 may implement or be implemented by aspects of any of the wireless communications systems, system diagrams, resource diagrams, or communication timelines described with reference to FIGS. 1 through 7. For example, the process flow 800 may include a UE 115-f, a network entity 105-e, and a core network 805, which may be examples of corresponding devices described with reference to FIGS. 1 through 7. In the following description of the process flow 800, operations between the UE 115-f, the network entity 105-e, and the core network 805 may be added, omitted, or performed in a different order (with respect to the exemplary order shown).

The UE 115-f may implement the process flow 800 to confirm or establish the accuracy of timing information at the UE 115-f. For example, the UE 115-f may determine that the UE 115-f is aligned with the network entity 105-e in time by performing a handshake procedure with the network entity 105-e.

At 810 (at time to), the UE 115-f may transmit a first message to the network entity 105-b. The first message may include a challenge that indicates a cryptographic number (e.g., a nonce), an ID of the UE 115-f (e.g., a temporary mobile subscriber identity (TMSI) or some other form of UE identification), and a cryptographic signature. The network entity 105-e may receive the challenge at time $t_1$.

At 815, the network entity 105-e may request credential information associated with the UE 115-f from the core network 805 (using the ID of the UE 115-f). At 820, the core network 805 may provide the requested credential information to the network entity 105-e.

At 825 ($t_2$), the network entity 105-e may transmit a second message that includes a response to the challenge. The UE 115-f may receive the second message at time $t_3$. The response from the network entity 105-e may indicate a second cryptographic number (nonce), the ID of the UE 115-f (e.g., UE ID), a time interval between reception of the first message and transmission of the second message (e.g., $\tau=(t_2-t_1)$), an encryption key, a cryptographic signature, or a combination thereof.

The time interval between reception of the first message and transmission of the second message (e.g., t) may include an RRH delay (if the RRH line is secure). The response (which may be a signed or cyphered response) may further indicate an absolute transmission time associated with the response (e.g., $t_2$), a subframe in which the network entity 105-e transmits the response, a key for common randomness (to complete the bootstrapping process), or other information.

At 830, the UE 115-f may check the response and determine whether to adjust one or more timing parameters based on the second message, a second time interval between reception of the second message ($t_3$) and transmission of the first message ($t_0$), a delay threshold of the UE 115-f, or some combination thereof. For example, the UE 115-f may check the response and calculate $\Delta t = t_3 - t_0 - \tau$. If the calculated delay is less than or equal to the delay threshold ($T_{max}$), the UE 115-f may set the true timing of $t_3$ to $t_2$.

Accordingly, the UE 115-f may acquire timing with an error between [0, $\Delta t$]. Depending on the delay threshold (error tolerance) of the UE 115-f (which may be provided to the UE 115-f), the UE 115-f may determine that the response is valid and transition from an NT state to a T state (as described with reference to FIG. 2).

Figure 9:
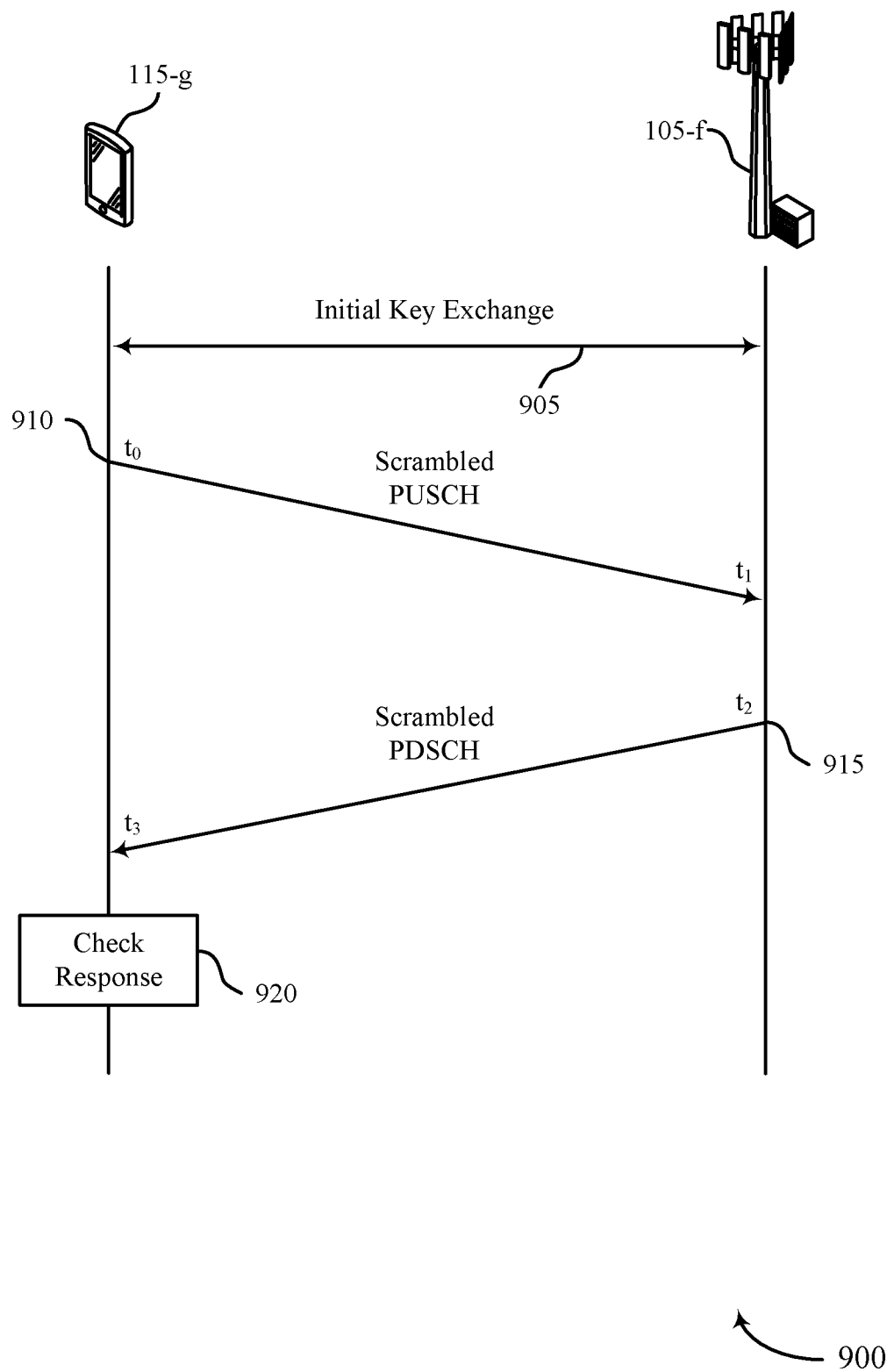

FIG. 9 illustrates an example of a process flow 900 that supports timing and synchronization techniques for secure networks in accordance with one or more aspects of the present disclosure. The process flow 900 may implement or be implemented by aspects of any of the wireless communications systems, system diagrams, resource diagrams, communication timelines, or process flows described with reference to FIGS. 1 through 8. For example, the process flow 900 may include a UE 115-g and a network entity 105-f, which may be examples of corresponding devices described with reference to FIGS. 1 through 8. In the following description of the process flow 900, operations between the UE 115-g and the network entity 105-f may be added, omitted, or performed in a different order (with respect to the exemplary order shown).

At 905, the UE 115-g and the network entity 105-f may perform an initial key exchange to obtain a common key. The UE 115-g and the network entity 105-f may omit or disregard any timing parameters signaled during the initial key exchange (as timing cannot be trusted at this point). The network entity may obtain the common key from the core network or via any suitable key exchange mechanism.

Cryptographic signatures may be used to verify that both devices have access to the common key. After the initial key exchange, the UE 115-g and the network entity 105-f may be aware of each other, and may implement additional steps to prevent attacking devices from performing early termination of decoding (as described with reference to FIG. 6).

At 910 ($t_0$), the UE 115-g may transmit a physical uplink shared channel (PUSCH) transmission (with rate-matched or coded bits) that is scrambled using a first PRF-generated sequence. The network entity 105-f may receive the scrambled PUSCH transmission at $t_1$. At 915 ($t_2$), the network entity 105-f may transmit a PDSCH transmission (with rate matched or coded bits) that is scrambled using a second PRF-generated sequence.

At 920, the UE 115-g may determine whether to adjust one or more timing parameters based on the scrambled PDSCH transmission, a time interval between reception of the second message ($t_3$) and transmission of the first message ($t_0$), and a delay threshold of the UE 115-g. For example, the UE 115-g may calculate $\Delta t = t_3 - t_0 - \tau$ and determine whether this time interval satisfies the delay threshold ($T_{max}$).

Accordingly, the UE 115-g may acquire timing with an error between [0, $\Delta t$]. Depending on the delay threshold or error tolerance of the UE 115-g (which may be provided to the UE 115-g), the UE 115-g may adjust one or more timing parameters (for example, by setting the true timing of $t_3$ to $t_2$) and transition from an NT state to a T state (as described with reference to FIG. 2).

Figure 10:
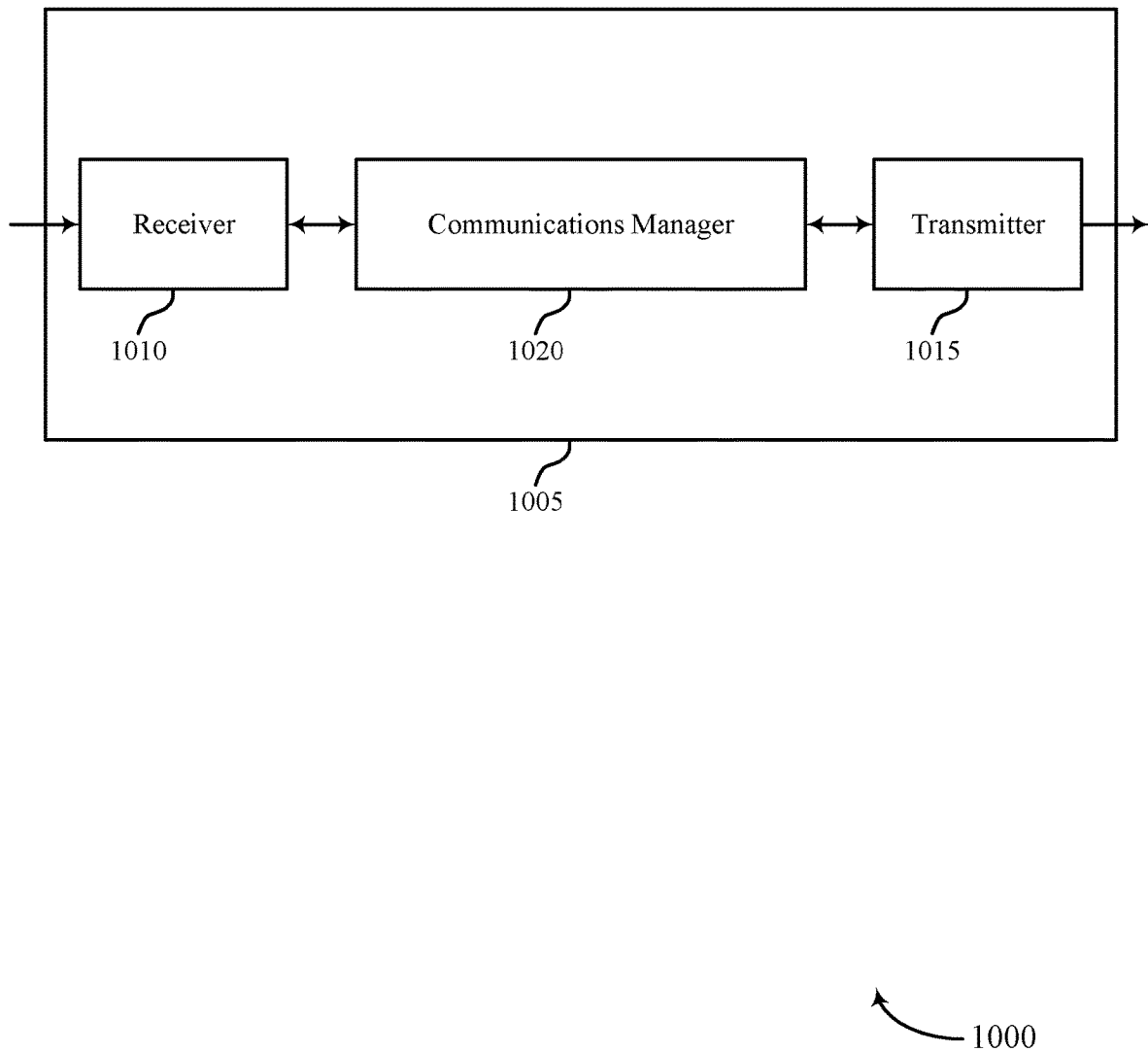
FIGS. 10 and 11 show block diagrams of devices that support timing and synchronization techniques for secure networks in accordance with one or more aspects of the present disclosure.

FIG. 10 shows a block diagram 1000 of a device 1005 that supports timing and synchronization techniques for secure networks in accordance with one or more aspects of the present disclosure. The device 1005 may be an example of aspects of a UE 115, as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to timing and synchronization techniques for secure networks). Information may be passed on to other components of the device 1005. The receiver 1010 may utilize a single antenna or multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to timing and synchronization techniques for secure networks). In some examples, the transmitter 1015 may be co-located with a receiver 1010 in a transceiver module. The transmitter 1015 may utilize a single antenna or multiple antennas.

The communications manager 1020, the receiver 1010, the transmitter 1015, or various combinations thereof or various components thereof may be examples of means for performing various aspects of timing and synchronization techniques for secure networks, as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations, as described herein.

The communications manager 1020 may support wireless communication at a UE (the device 1005) in accordance with examples disclosed herein. For example, the communications manager 1020 may be configured as or otherwise support a means for monitoring a set of time-frequency resources for one or more CDS associated with a pseudo-random sequence, where the pseudo-random sequence and the set of time-frequency resources are indicated by an output of a PRF that is based on a timing parameter, a cell ID, and a shared key. The communications manager 1020 may be configured as or otherwise support a means for communicating with a network entity via a cell associated with the cell ID based on monitoring the set of time-frequency resources for the one or more CDS.

Additionally, or alternatively, the communications manager 1020 may support wireless communication at a UE (the device 1005) in accordance with examples disclosed herein. For example, the communications manager 1020 may be configured as or otherwise support a means for transmitting a first message that indicates an ID of the UE and a first cryptographic number. The communications manager 1020 may be configured as or otherwise support a means for receiving, in response to the first message, a second message that indicates the ID of the UE, a first time interval, and a second cryptographic number. The communications manager 1020 may be configured as or otherwise support a means for performing a time calibration procedure based on the second message, a second time interval between reception of the second message and transmission of the first message, and a delay threshold of the UE.

By including or configuring the communications manager 1020 in accordance with examples, as described herein, the device 1005 (e.g., a processor controlling or otherwise coupled with the receiver 1010, the transmitter 1015, the communications manager 1020, or a combination thereof) may support techniques for reduced power consumption by reducing the number of retransmissions performed or requested by the device 1005. For example, the techniques described herein may reduce the likelihood of replay attacks adversely affecting communications between the device 1005 and other devices in a secure network, thereby increasing the likelihood of the device 1005 successfully receiving transmissions from these devices. As a result, the device 1005 may request fewer retransmissions, which may result in decreased power consumption at the device 1005 (e.g., by enabling the device 1005 to remain in sleep mode for a longer duration).

Figure 11:
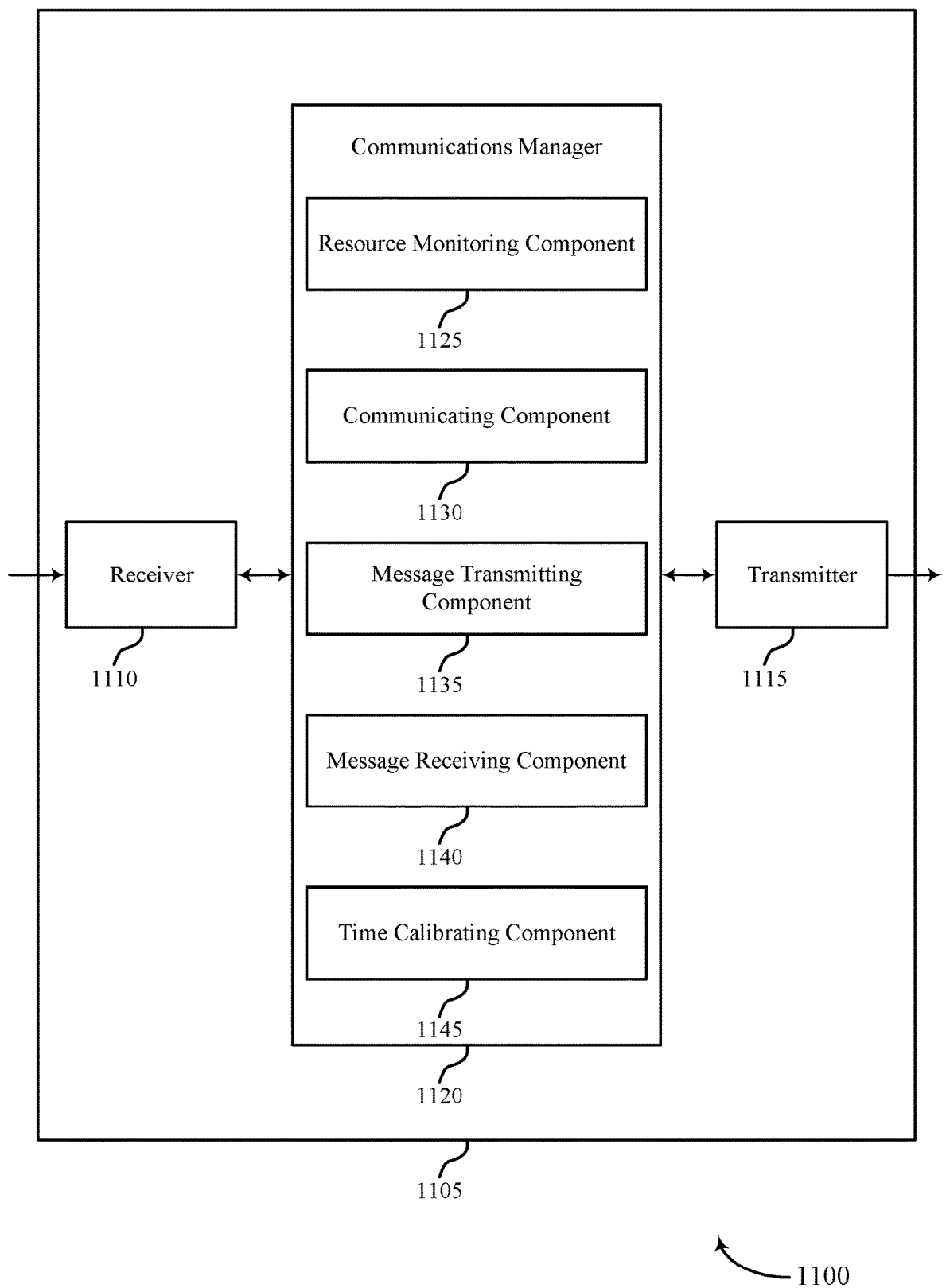

FIG. 11 shows a block diagram 1100 of a device 1105 that supports timing and synchronization techniques for secure networks in accordance with one or more aspects of the present disclosure. The device 1105 may be an example of aspects of a device 1005 or a UE 115, as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to timing and synchronization techniques for secure networks). Information may be passed on to other components of the device 1105. The receiver 1110 may utilize a single antenna or multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to timing and synchronization techniques for secure networks). In some examples, the transmitter 1115 may be co-located with a receiver 1110 in a transceiver module. The transmitter 1115 may utilize a single antenna or multiple antennas.

The device 1105, or various components thereof, may be an example of means for performing various aspects of timing and synchronization techniques for secure networks, as described herein. For example, the communications manager 1120 may include a resource monitoring component 1125, a communicating component 1130, a message transmitting component 1135, a message receiving component 1140, a time calibrating component 1145, or any combination thereof. The communications manager 1120 may be an example of aspects of a communications manager 1020, as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations, as described herein.

The communications manager 1120 may support wireless communication at a UE (the device 1105) in accordance with examples disclosed herein. The resource monitoring component 1125 may be configured as or otherwise support a means for monitoring a set of time-frequency resources for one or more CDS associated with a pseudo-random sequence, where the pseudo-random sequence and the set of time-frequency resources are indicated by an output of a PRF that is based on a timing parameter, a cell ID, and a shared key. The communicating component 1130 may be configured as or otherwise support a means for communicating with a network entity via a cell associated with the cell ID based on monitoring the set of time-frequency resources for the one or more CDS.

Additionally, or alternatively, the communications manager 1120 may support wireless communication at a UE (the device 1105) in accordance with examples disclosed herein. The message transmitting component 1135 may be configured as or otherwise support a means for transmitting a first message that indicates an ID of the UE and a first cryptographic number. The message receiving component 1140 may be configured as or otherwise support a means for receiving, in response to the first message, a second message that indicates the ID of the UE, a first time interval, and a second cryptographic number. The time calibrating component 1145 may be configured as or otherwise support a means for performing a time calibration procedure based on the second message, a second time interval between reception of the second message and transmission of the first message, and a delay threshold of the UE.

Figure 12:
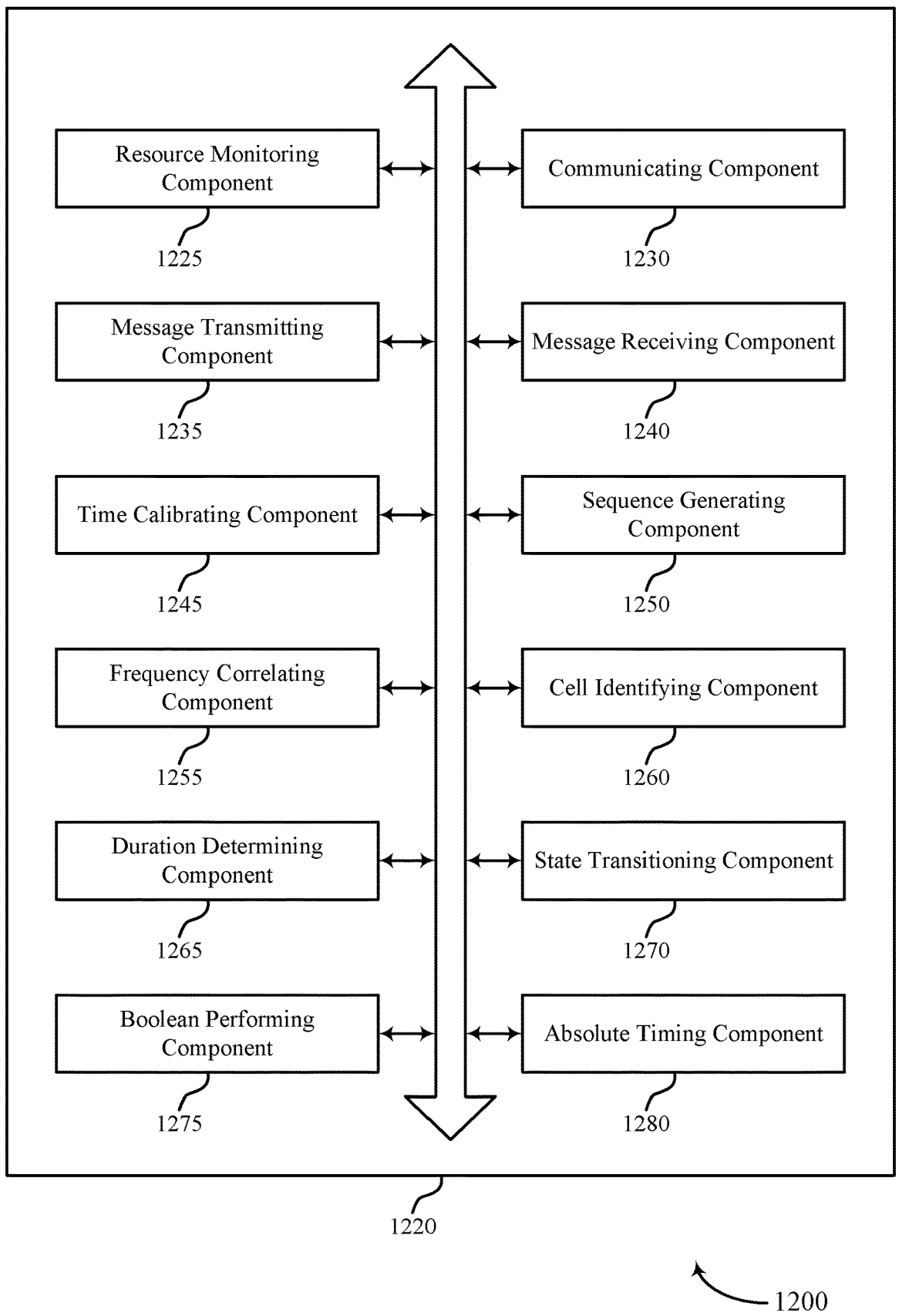
FIG. 12 shows a block diagram of a communications manager that supports timing and synchronization techniques for secure networks in accordance with one or more aspects of the present disclosure.

FIG. 12 shows a block diagram 1200 of a communications manager 1220 that supports timing and synchronization techniques for secure networks in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of timing and synchronization techniques for secure networks, as described herein. For example, the communications manager 1220 may include a resource monitoring component 1225, a communicating component 1230, a message transmitting component 1235, a message receiving component 1240, a time calibrating component 1245, a sequence generating component 1250, a frequency correlating component 1255, a cell identifying component 1260, a duration determining component 1265, a state transitioning component 1270, a Boolean performing component 1275, an absolute timing component 1280, or any combination thereof. Each of these components may communicate, directly or indirectly, with one another (e.g., via one or more buses).

The communications manager 1220 may support wireless communication at a UE in accordance with examples disclosed herein. The resource monitoring component 1225 may be configured as or otherwise support a means for monitoring a set of time-frequency resources for one or more CDS associated with a pseudo-random sequence, where the pseudo-random sequence and the set of time-frequency resources are indicated by an output of a PRF that is based on a timing parameter, a cell ID, and a shared key. The communicating component 1230 may be configured as or otherwise support a means for communicating with a network entity via a cell associated with the cell ID based on monitoring the set of time-frequency resources for the one or more CDS.

In some examples, the sequence generating component 1250 may be configured as or otherwise support a means for obtaining two or more bit sequences based on making two or more calls to the PRF. In some examples, the sequence generating component 1250 may be configured as or otherwise support a means for generating the pseudo-random sequence and resource location information by aggregating the two or more bit sequences, where the resource location information indicates the set of time-frequency resources.

In some examples, the sequence generating component 1250 may be configured as or otherwise support a means for generating a first pseudo-random sequence and first frequency location information at a first time. In some examples, the sequence generating component 1250 may be configured as or otherwise support a means for generating a second pseudo-random sequence and second frequency location information at a second time, where a duration between the first time and the second time corresponds to a periodicity of the one or more CDS.

In some examples, the sequence generating component 1250 may be configured as or otherwise support a means for generating multiple bits that indicate one or more symbol locations and PRB locations to monitor for the one or more CDS.

In some examples, to support monitoring the set of time-frequency resources, the frequency correlating component 1255 may be configured as or otherwise support a means for performing a frequency-domain correlation of multiple REs in the set of time-frequency resources.

In some examples, the cell identifying component 1260 may be configured as or otherwise support a means for identifying multiple cell groups associated with respective cell group IDs. In some examples, the sequence generating component 1250 may be configured as or otherwise support a means for generating a pseudo-random output for each cell group of the multiple cell groups based on the respective multiple cell group IDs, where the pseudo-random output includes a pseudo-random sequence and a set of time-frequency resource locations associated with one of the multiple cell groups.

In some examples, the cell identifying component 1260 may be configured as or otherwise support a means for selecting a subset of the multiple cell groups based on monitoring the set of time-frequency resource locations associated with each of the multiple cell groups. In some examples, the sequence generating component 1250 may be configured as or otherwise support a means for generating a pseudo-random output for each cell in the subset of the multiple cell groups, where the pseudo-random output includes a pseudo-random sequence and a set of time-frequency resource locations associated with a cell in the subset of the multiple cell groups. In some examples, the one or more CDS include a P-CDS that is TDM-ed with an S-CDS.

In some examples, the sequence generating component 1250 may be configured as or otherwise support a means for generating a pseudo-random cell ID that is a function of the shared key, a PCID associated with the cell of the network entity, and a timestamp associated with generation of the pseudo-random cell ID, where the output of the pseudo-random function is based on the pseudo-random cell ID. In some examples, the timestamp indicates a slot, an SFN, or a UTC associated with generation of the pseudo-random cell ID.

In some examples, the Boolean performing component 1275 may be configured as or otherwise support a means for performing a Boolean operation on one or more LSBs of a pseudo-random output and the PCID associated with the cell of the network entity, where generating the pseudo-random cell ID is based on a result of the Boolean operation.

In some examples, the sequence generating component 1250 may be configured as or otherwise support a means for generating the output of the PRF based on a time drift threshold of the UE, where the output indicates a pseudo-random bit sequence and a set of time-frequency resource locations. In some examples, the resource monitoring component 1225 may be configured as or otherwise support a means for monitoring the set of time-frequency resource locations for one or more TSS that indicate the pseudo-random bit sequence.

In some examples, the absolute timing component 1280 may be configured as or otherwise support a means for acquiring absolute timing information based on measuring the one or more TSS, where the timing parameter is based on the absolute timing information.

Additionally, or alternatively, the communications manager 1220 may support wireless communication at a UE in accordance with examples disclosed herein. The message transmitting component 1235 may be configured as or otherwise support a means for transmitting a first message that indicates an ID of the UE and a first cryptographic number. The message receiving component 1240 may be configured as or otherwise support a means for receiving, in response to the first message, a second message that indicates the ID of the UE, a first time interval, and a second cryptographic number. The time calibrating component 1245 may be configured as or otherwise support a means for performing a time calibration procedure based on the second message, a second time interval between reception of the second message and transmission of the first message, and a delay threshold of the UE.

In some examples, to support performing the time calibration procedure, the duration determining component 1265 may be configured as or otherwise support a means for determining that a duration of the second time interval is less than a summation of the delay threshold and a duration of the first time interval. In some examples, to support performing the time calibration procedure, the time calibrating component 1245 may be configured as or otherwise support a means for updating one or more time settings of the UE based on a timestamp associated with transmission of the second message and a timestamp associated with reception of the second message.

In some examples, to support performing the time calibration procedure, the time calibrating component 1245 may be configured as or otherwise support a means for refraining from performing a timing adjustment based on determining that a duration of the second time interval is greater than a summation of the delay threshold and a duration of the first time interval, where the first time interval corresponds to a duration between transmission of the second message and reception of the first message.

In some examples, to support receiving the second message, the time calibrating component 1245 may be configured as or otherwise support a means for receiving an indication of an absolute time associated with transmission of the second message, a subframe associated with transmission of the second message, or both, where performing the time calibration procedure is based on the indication.

In some examples, the first message includes a PUSCH transmission that is scrambled using a first pseudo-random sequence. In some examples, the second message includes a PDSCH transmission that is scrambled using a second pseudo-random sequence.

In some examples, to support performing the time calibration procedure, the duration determining component 1265 may be configured as or otherwise support a means for determining that a product of a scaling factor and a duration of the first time interval is less than the delay threshold, where the scaling factor is based on an error rate associated with a local oscillator of the UE. In some examples, to support performing the time calibration procedure, the time calibrating component 1245 may be configured as or otherwise support a means for performing a time adjustment based on a timestamp associated with transmission of the second message and a timestamp associated with reception of the second message.

In some examples, the state transitioning component 1270 may be configured as or otherwise support a means for transitioning from an unsynchronized timing state to a synchronized timing state after performing the time calibration procedure, where the UE initiates the time calibration procedure in response to entering the unsynchronized timing state.

Figure 13:
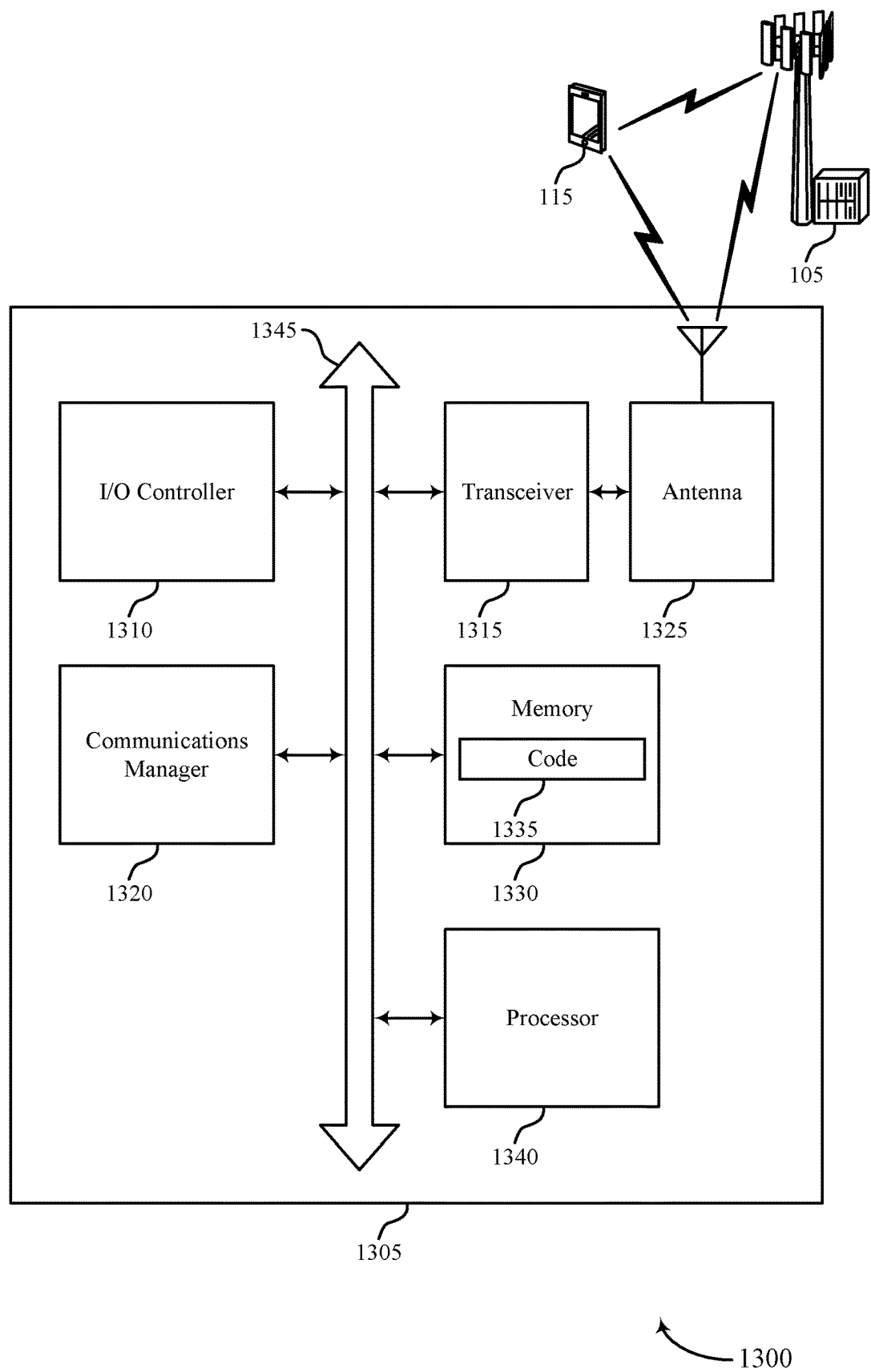
FIG. 13 shows a diagram of a system including a device that supports timing and synchronization techniques for secure networks in accordance with one or more aspects of the present disclosure.

FIG. 13 shows a diagram of a system 1300 including a device 1305 that supports timing and synchronization techniques for secure networks in accordance with one or more aspects of the present disclosure. The device 1305 may be an example of or include the components of a device 1005, a device 1105, or a UE 115, as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links, as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting timing and synchronization techniques for secure networks). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communication at a UE (the device 1305) in accordance with examples disclosed herein. For example, the communications manager 1320 may be configured as or otherwise support a means for monitoring a set of time-frequency resources for one or more CDS associated with a pseudo-random sequence, where the pseudo-random sequence and the set of time-frequency resources are indicated by an output of a PRF that is based on a timing parameter, a cell ID, and a shared key. The communications manager 1320 may be configured as or otherwise support a means for communicating with a network entity via a cell associated with the cell ID based on monitoring the set of time-frequency resources for the one or more CDS.

Additionally, or alternatively, the communications manager 1320 may support wireless communication at a UE in accordance with examples disclosed herein. For example, the communications manager 1320 may be configured as or otherwise support a means for transmitting a first message that indicates an ID of the UE and a first cryptographic number. The communications manager 1320 may be configured as or otherwise support a means for receiving, in response to the first message, a second message that indicates the ID of the UE, a first time interval, and a second cryptographic number. The communications manager 1320 may be configured as or otherwise support a means for performing a time calibration procedure based on the second message, a second time interval between reception of the second message and transmission of the first message, and a delay threshold of the UE.

By including or configuring the communications manager 1320 in accordance with examples, as described herein, the device 1305 may support techniques for improved security, reduced interference, and greater reliability, among other benefits. For example, the timing and synchronization procedures described herein may enable one or both of the device 1305 or a network entity to mitigate jamming attacks, impersonation attacks, replay attacks, and eavesdropping attacks from external threats, which may increase the likelihood of successful communications between the device 1305 and the network entity.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of timing and synchronization techniques for secure networks, as described herein, or the processor 1340 and the memory 1330 may be otherwise configured to perform or support such operations.

Figure 14:
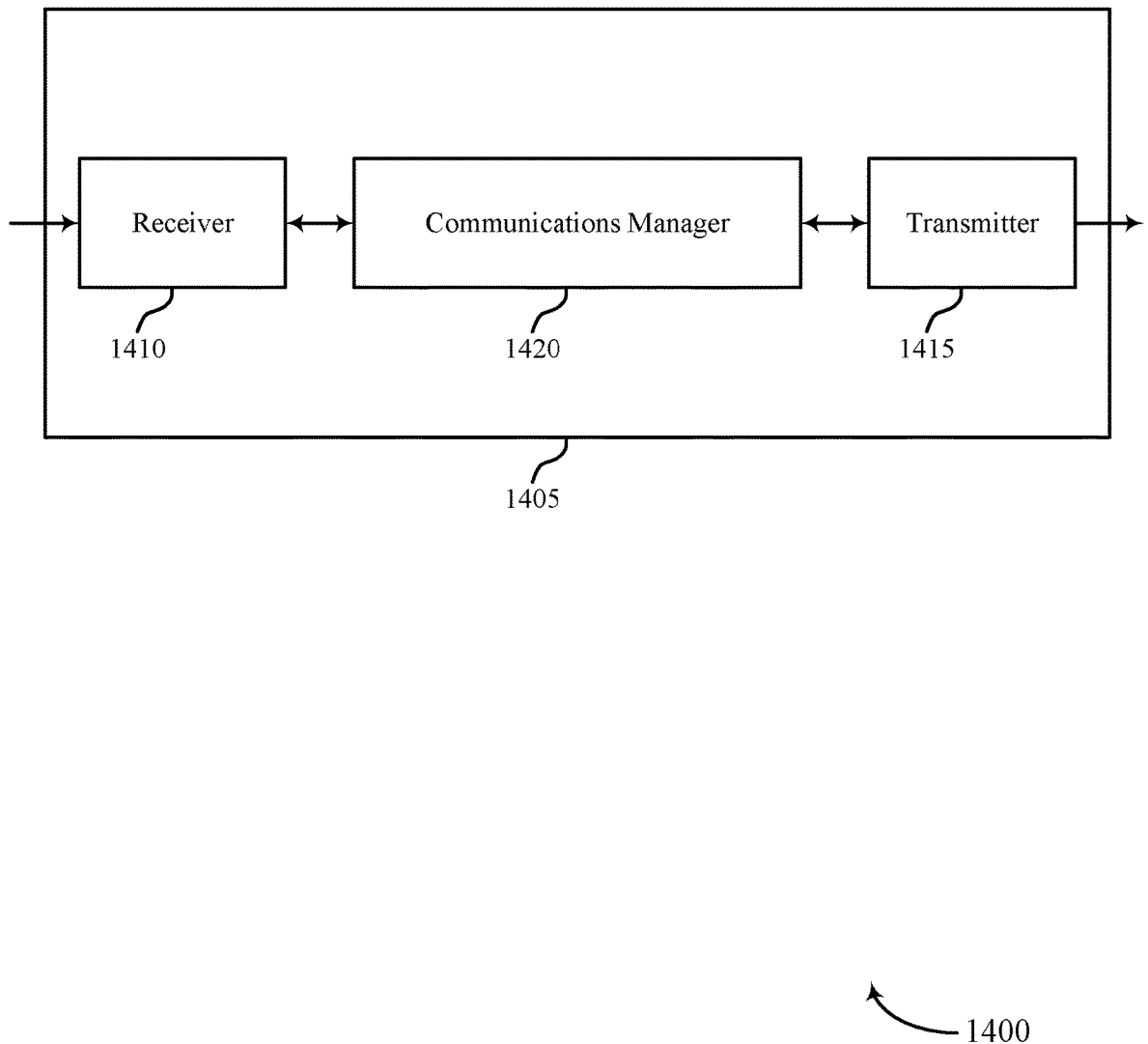
FIGS. 14 and 15 show block diagrams of devices that support timing and synchronization techniques for secure networks in accordance with one or more aspects of the present disclosure.

FIG. 14 shows a block diagram 1400 of a device 1405 that supports timing and synchronization techniques for secure networks in accordance with one or more aspects of the present disclosure. The device 1405 may be an example of aspects of a network entity 105, as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The communications manager 1420, the receiver 1410, the transmitter 1415, or various combinations thereof or various components thereof may be examples of means for performing various aspects of timing and synchronization techniques for secure networks, as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry).

The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1420 may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations, as described herein.

The communications manager 1420 may support wireless communication at a network entity (the device 1405) in accordance with examples disclosed herein. For example, the communications manager 1420 may be configured as or otherwise support a means for transmitting, via a set of time-frequency resources, one or more CDS associated with a pseudo-random sequence, where the pseudo-random sequence and the set of time-frequency resources are indicated by an output of a PRF that is based on a timing parameter, a cell ID, and a shared key. The communications manager 1420 may be configured as or otherwise support a means for communicating with a UE via a cell associated with the cell ID based on transmitting the one or more CDS via the set of time-frequency resources.

Additionally, or alternatively, the communications manager 1420 may support wireless communication at a network entity (the device 1405) in accordance with examples disclosed herein. For example, the communications manager 1420 may be configured as or otherwise support a means for receiving a first message that indicates an ID of a UE and a first cryptographic number. The communications manager 1420 may be configured as or otherwise support a means for performing an authentication procedure based on using the ID of the UE to retrieve credential information associated with the UE. The communications manager 1420 may be configured as or otherwise support a means for transmitting, in response to the first message and based on a result of the authentication procedure, a second message that indicates the ID of the UE, a time interval, and a second cryptographic number.

By including or configuring the communications manager 1420 in accordance with examples, as described herein, the device 1405 (e.g., a processor controlling or otherwise coupled with the receiver 1410, the transmitter 1415, the communications manager 1420, or a combination thereof) may support techniques for reduced power consumption by reducing the number of retransmissions performed or requested by the device 1405. For example, the techniques described herein may reduce the likelihood of replay attacks adversely affecting communications between the device 1405 and a UE in a secure network, thereby increasing the likelihood of the device 1405 successfully communicating with the UE. As a result, the device 1405 may perform fewer retransmissions, which may result in decreased power consumption at the device 1405.

Figure 15:
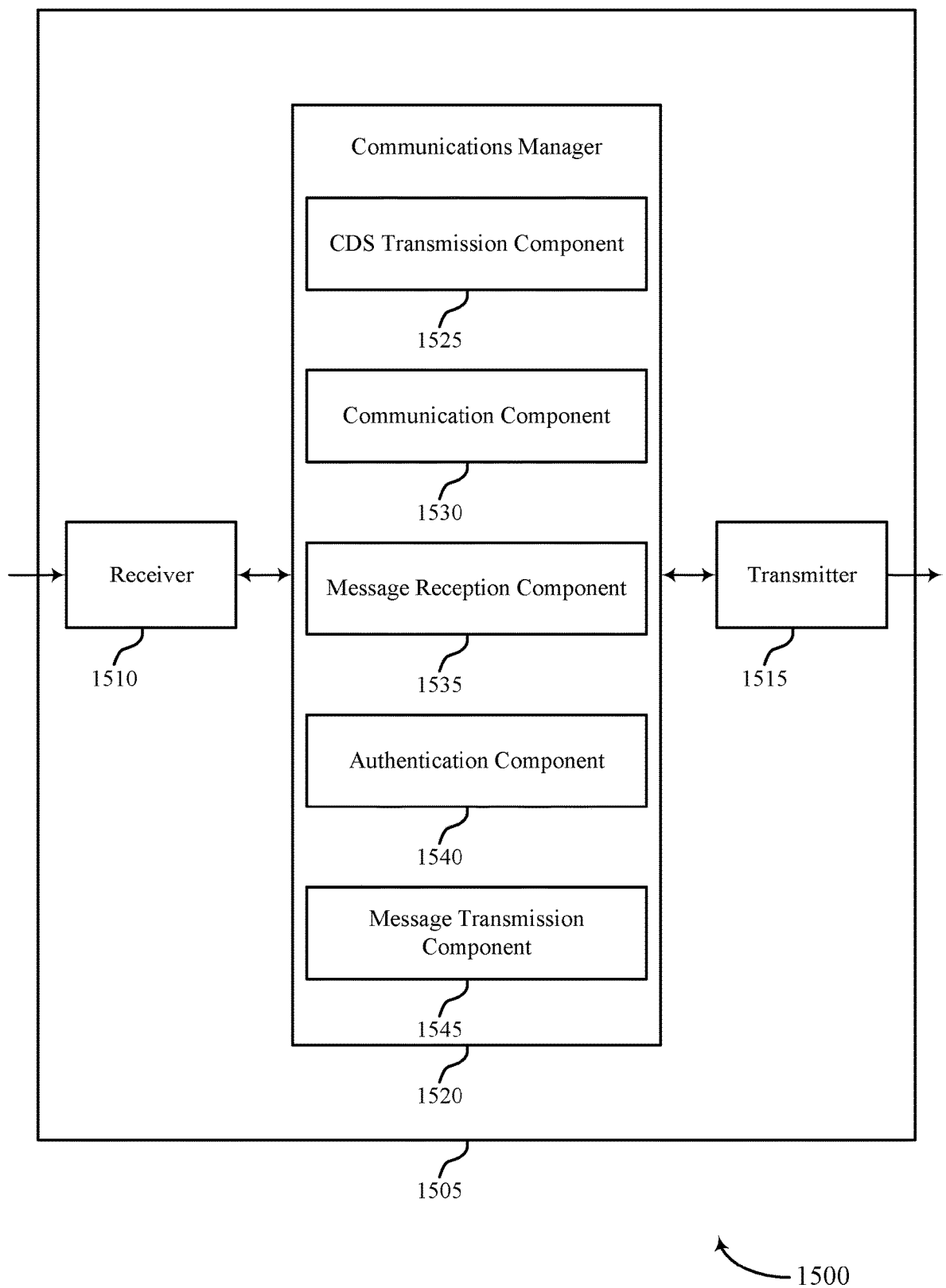

FIG. 15 shows a block diagram 1500 of a device 1505 that supports timing and synchronization techniques for secure networks in accordance with one or more aspects of the present disclosure. The device 1505 may be an example of aspects of a device 1405 or a network entity 105, as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The device 1505, or various components thereof, may be an example of means for performing various aspects of timing and synchronization techniques for secure networks, as described herein. For example, the communications manager 1520 may include a CDS transmission component 1525, a communication component 1530, a message reception component 1535, an authentication component 1540, a message transmission component 1545, or any combination thereof. The communications manager 1520 may be an example of aspects of a communications manager 1420, as described herein. In some examples, the communications manager 1520, or various components thereof, may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations, as described herein.

The communications manager 1520 may support wireless communication at a network entity (the device 1505) in accordance with examples disclosed herein. The CDS transmission component 1525 may be configured as or otherwise support a means for transmitting, via a set of time-frequency resources, one or more CDS associated with a pseudo-random sequence, where the pseudo-random sequence and the set of time-frequency resources are indicated by an output of a PRF that is based on a timing parameter, a cell ID, and a shared key. The communication component 1530 may be configured as or otherwise support a means for communicating with a UE via a cell associated with the cell ID based on transmitting the one or more CDS via the set of time-frequency resources.

Additionally, or alternatively, the communications manager 1520 may support wireless communication at a network entity (the device 1505) in accordance with examples disclosed herein. The message reception component 1535 may be configured as or otherwise support a means for receiving a first message that indicates an ID of a UE and a first cryptographic number. The authentication component 1540 may be configured as or otherwise support a means for performing an authentication procedure based on using the ID of the UE to retrieve credential information associated with the UE. The message transmission component 1545 may be configured as or otherwise support a means for transmitting, in response to the first message and based on a result of the authentication procedure, a second message that indicates the ID of the UE, a time interval, and a second cryptographic number.

Figure 16:
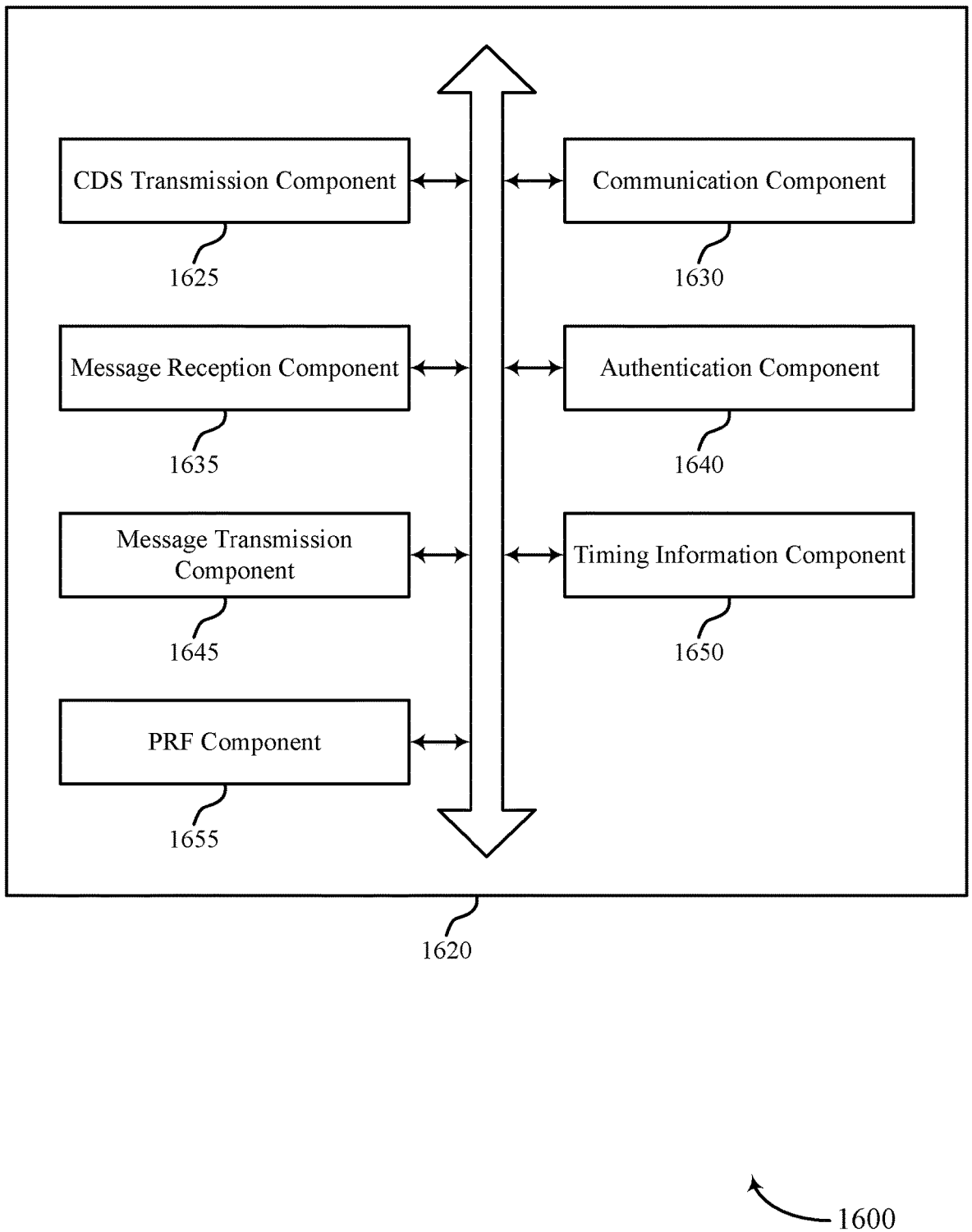
FIG. 16 shows a block diagram of a communications manager that supports timing and synchronization techniques for secure networks in accordance with one or more aspects of the present disclosure.

FIG. 16 shows a block diagram 1600 of a communications manager 1620 that supports timing and synchronization techniques for secure networks in accordance with one or more aspects of the present disclosure. The communications manager 1620 may be an example of aspects of a communications manager 1420, a communications manager 1520, or both, as described herein. The communications manager 1620, or various components thereof, may be an example of means for performing various aspects of timing and synchronization techniques for secure networks, as described herein. For example, the communications manager 1620 may include a CDS transmission component 1625, a communication component 1630, a message reception component 1635, an authentication component 1640, a message transmission component 1645, a timing information component 1650, an PRF component 1655, or any combination thereof.

Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1620 may support wireless communication at a network entity in accordance with examples disclosed herein. The CDS transmission component 1625 may be configured as or otherwise support a means for transmitting, via a set of time-frequency resources, one or more CDS associated with a pseudo-random sequence, where the pseudo-random sequence and the set of time-frequency resources are indicated by an output of a PRF that is based on a timing parameter, a cell ID, and a shared key. The communication component 1630 may be configured as or otherwise support a means for communicating with a UE via a cell associated with the cell ID based on transmitting the one or more CDS via the set of time-frequency resources.

In some examples, the timing information component 1650 may be configured as or otherwise support a means for acquiring absolute timing information via a GNSS, where the timing parameter is based on the absolute timing information.

In some examples, to support transmitting the one or more CDS, the CDS transmission component 1625 may be configured as or otherwise support a means for transmitting the one or more CDS via two or more carrier frequencies in accordance with a frequency hopping communication scheme. In some examples, each cell of the network entity is associated with a different pseudo-random cell ID.

In some examples, the PRF component 1655 may be configured as or otherwise support a means for inputting, to the pseudo-random function, the shared key and a seed parameter that includes an absolute time bit sequence, frequency bit sequence, a PCID bit sequence, a time-specific parameterization bit sequence, or a combination thereof, where the output of the PRF indicates the pseudo-random sequence and the set of time-frequency resources.

In some examples, the PRF component 1655 may be configured as or otherwise support a means for generating a pseudo-random cell ID for a cell of the network entity based on the shared key, a PCID of the cell, and a timestamp associated with generation of the pseudo-random cell ID, where the output of the PRF is based on the pseudo-random cell ID.

Additionally, or alternatively, the communications manager 1620 may support wireless communication at a network entity in accordance with examples disclosed herein. The message reception component 1635 may be configured as or otherwise support a means for receiving a first message that indicates an ID of a UE and a first cryptographic number. The authentication component 1640 may be configured as or otherwise support a means for performing an authentication procedure based on using the ID of the UE to retrieve credential information associated with the UE. The message transmission component 1645 may be configured as or otherwise support a means for transmitting, in response to the first message and based on a result of the authentication procedure, a second message that indicates the ID of the UE, a time interval, and a second cryptographic number.

In some examples, to support transmitting the second message, the message transmission component 1645 may be configured as or otherwise support a means for transmitting an indication of a pseudo-random key to use for encrypting subsequent messages between the UE and the network entity.

In some examples, to support performing the authentication procedure, the authentication component 1640 may be configured as or otherwise support a means for obtaining a shared key based on the credential information associated with the UE. In some examples, to support performing the authentication procedure, the authentication component

1640 may be configured as or otherwise support a means for validating a cryptographic signature of the first message based on the shared key.

In some examples, the message transmission component 1645 may be configured as or otherwise support a means for exchanging one or more messages with the UE to acquire a shared key prior to receiving the first message.

Figure 17:
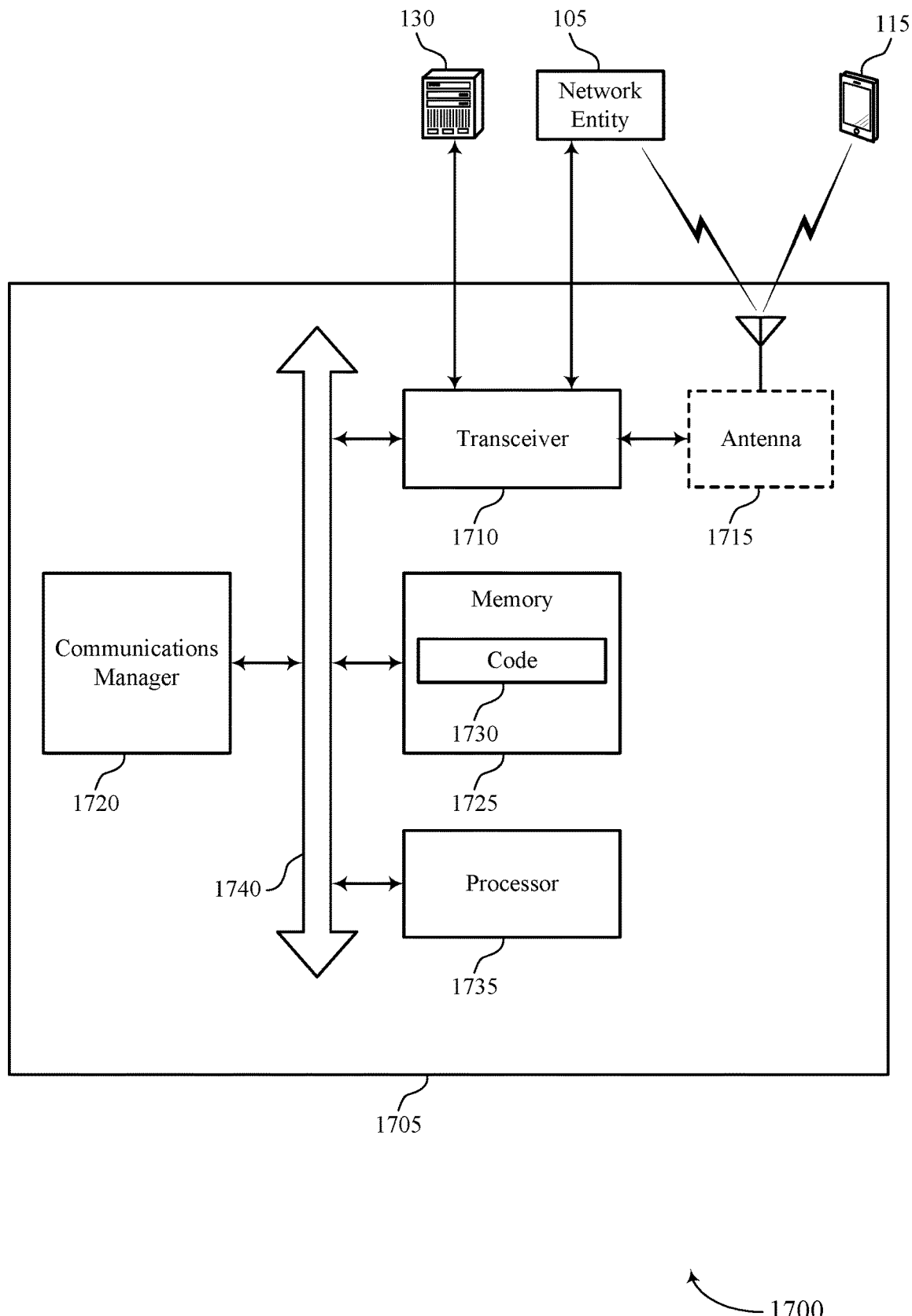
FIG. 17 shows a diagram of a system including a device that supports timing and synchronization techniques for secure networks in accordance with one or more aspects of the present disclosure.

FIG. 17 shows a diagram of a system 1700 including a device 1705 that supports timing and synchronization techniques for secure networks in accordance with one or more aspects of the present disclosure. The device 1705 may be an example of or include the components of a device 1405, a device 1505, or a network entity 105, as described herein. The device 1705 may communicate with one or more network entities 105, one or more UEs 115, or any combination thereof, which may include communications over one or more wired interfaces, over one or more wireless interfaces, or any combination thereof. The device 1705 may include components that support outputting and obtaining communications, such as a communications manager 1720, a transceiver 1710, an antenna 1715, a memory 1725, code 1730, and a processor 1735. These components may be in electronic communication or otherwise coupled (e.g., operatively, communicatively, functionally, electronically, electrically) via one or more buses (e.g., a bus 1740).

The transceiver 1710 may support bi-directional communications via wired links, wireless links, or both, as described herein. In some examples, the transceiver 1710 may include a wired transceiver and may communicate bi-directionally with another wired transceiver. Additionally, or alternatively, in some examples, the transceiver 1710 may include a wireless transceiver and may communicate bi-directionally with another wireless transceiver. In some examples, the device 1705 may include one or more antennas 1715, which may be capable of transmitting or receiving wireless transmissions (e.g., concurrently). The transceiver 1710 may also include a modem to modulate signals, to provide the modulated signals for transmission (e.g., by one or more antennas 1715, by a wired transmitter), to receive modulated signals (e.g., from one or more antennas 1715, from a wired receiver), and to demodulate signals. In some implementations, the transceiver 1710 may include one or more interfaces, such as one or more interfaces coupled with the one or more antennas 1715 that are configured to support various receiving or obtaining operations, or one or more interfaces coupled with the one or more antennas 1715 that are configured to support various transmitting or outputting operations, or a combination thereof.

In some implementations, the transceiver 1710 may include or be configured for coupling with one or more processors or memory components that are operable to perform or support operations based on received or obtained information or signals, or to generate information or other signals for transmission or other outputting, or any combination thereof. In some implementations, the transceiver 1710, or the transceiver 1710 and the one or more antennas 1715, or the transceiver 1710 and the one or more antennas 1715 and one or more processors or memory components (for example, the processor 1735, or the memory 1725, or both), may be included in a chip or chip assembly that is installed in the device 1705. In some examples, the transceiver may be operable to support communications via one or more communications links (e.g., a communication link 125, a backhaul communication link 120, a midhaul communication link 162, a fronthaul communication link 168).

The memory 1725 may include RAM and ROM. The memory 1725 may store computer-readable, computer-executable code 1730 including instructions that, when executed by the processor 1735, cause the device 1705 to perform various functions described herein. The code 1730 may be stored in a non-transitory computer-readable medium such as system memory or another type of memory. In some cases, the code 1730 may not be directly executable by the processor 1735 but may cause a computer (e.g., when compiled and executed) to perform functions described herein. In some cases, the memory 1725 may contain, among other things, a BIOS which may control basic hardware or software operation such as the interaction with peripheral components or devices.

The processor 1735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1735 may be configured to operate a memory array using a memory controller. In some other cases, a memory controller may be integrated into the processor 1735. The processor 1735 may be configured to execute computer-readable instructions stored in a memory (e.g., the memory 1725) to cause the device 1705 to perform various functions (e.g., functions or tasks supporting timing and synchronization techniques for secure networks).

For example, the device 1705 or a component of the device 1705 may include a processor 1735 and memory 1725 coupled with the processor 1735, the processor 1735 and memory 1725 configured to perform various functions described herein. The processor 1735 may be an example of a cloud-computing platform (e.g., one or more physical nodes and supporting software such as operating systems, virtual machines, or container instances) that may host the functions (e.g., by executing code 1730) to perform the functions of the device 1705. The processor 1735 may be any one or more suitable processors capable of executing scripts or instructions of one or more software programs stored in the device 1705 (such as within the memory 1725). In some implementations, the processor 1735 may be a component of a processing system.

A processing system may generally refer to a system or series of machines or components that receives inputs and processes the inputs to produce a set of outputs (which may be passed to other systems or components of, for example, the device 1705). For example, a processing system of the device 1705 may refer to a system including the various other components or subcomponents of the device 1705, such as the processor 1735, or the transceiver 1710, or the communications manager 1720, or other components or combinations of components of the device 1705. The processing system of the device 1705 may interface with other components of the device 1705, and may process information received from other components (such as inputs or signals) or output information to other components.

For example, a chip or modem of the device 1705 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1705 may transmit information output from the chip or modem.

Additionally, or alternatively, in some implementations, the one or more interfaces may refer to an interface between the processing system of the chip or modem and a receiver, such that the device 1705 may obtain information or signal inputs, and the information may be passed to the processing system. A person having ordinary skill in the art will readily recognize that a first interface also may obtain information or signal inputs, and a second interface also may output information or signal outputs.

In some examples, a bus 1740 may support communications of (e.g., within) a protocol layer of a protocol stack. In some examples, a bus 1740 may support communications associated with a logical channel of a protocol stack (e.g., between protocol layers of a protocol stack), which may include communications performed within a component of the device 1705, or between different components of the device 1705 that may be co-located or located in different locations (e.g., where the device 1705 may refer to a system in which one or more of the communications manager 1720, the transceiver 1710, the memory 1725, the code 1730, and the processor 1735 may be located in one of the different components or divided between different components).

In some examples, the communications manager 1720 may manage aspects of communications with a core network 130 (e.g., via one or more wired or wireless backhaul links). For example, the communications manager 1720 may manage the transfer of data communications for client devices, such as one or more UEs 115. In some examples, the communications manager 1720 may manage communications with other network entities 105, and may include a controller or scheduler for controlling communications with UEs 115 in cooperation with other network entities 105. In some examples, the communications manager 1720 may support an X2 interface within an LTE/LTE-A wireless communications network technology to provide communication between network entities 105.

The communications manager 1720 may support wireless communication at a network entity (the device 1705) in accordance with examples disclosed herein. For example, the communications manager 1720 may be configured as or otherwise support a means for transmitting, via a set of time-frequency resources, one or more CDS associated with a pseudo-random sequence, where the pseudo-random sequence and the set of time-frequency resources are indicated by an output of a PRF that is based on a timing parameter, a cell ID, and a shared key. The communications manager 1720 may be configured as or otherwise support a means for communicating with a UE via a cell associated with the cell ID based on transmitting the one or more CDS via the set of time-frequency resources.

Additionally, or alternatively, the communications manager 1720 may support wireless communication at a network entity (the device 1705) in accordance with examples disclosed herein. For example, the communications manager 1720 may be configured as or otherwise support a means for receiving a first message that indicates an ID of a UE and a first cryptographic number. The communications manager 1720 may be configured as or otherwise support a means for performing an authentication procedure based on using the ID of the UE to retrieve credential information associated with the UE. The communications manager 1720 may be configured as or otherwise support a means for transmitting, in response to the first message and based on a result of the authentication procedure, a second message that indicates the ID of the UE, a time interval, and a second cryptographic number.

By including or configuring the communications manager 1720 in accordance with examples, as described herein, the device 1705 may support techniques for improved security, reduced interference, and greater reliability, among other benefits. For example, the timing and synchronization procedures described herein may enable one or both of the device 1705 or a UE to mitigate jamming attacks, impersonation attacks, replay attacks, and eavesdropping attacks from other devices, which may increase the likelihood of successful communications between the device 1705 and the UE.

In some examples, the communications manager 1720 may be configured to perform various operations (e.g., receiving, obtaining, monitoring, outputting, transmitting) using or otherwise in cooperation with the transceiver 1710, the one or more antennas 1715 (e.g., where applicable), or any combination thereof. Although the communications manager 1720 is illustrated as a separate component, in some examples, one or more functions described with reference to the communications manager 1720 may be supported by or performed by the transceiver 1710, the processor 1735, the memory 1725, the code 1730, or any combination thereof. For example, the code 1730 may include instructions executable by the processor 1735 to cause the device 1705 to perform various aspects of timing and synchronization techniques for secure networks, as described herein, or the processor 1735 and the memory 1725 may be otherwise configured to perform or support such operations.

Figure 18:
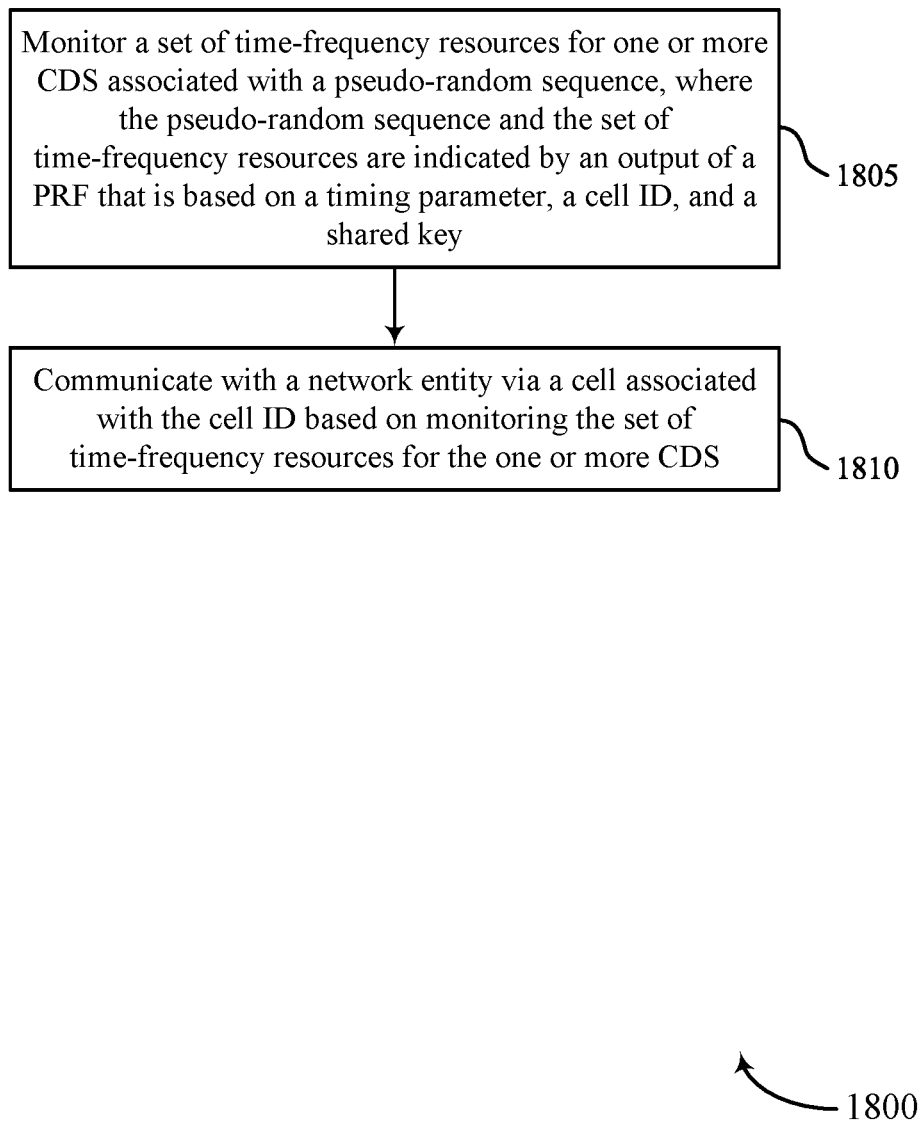
FIGS. 18 through 21 show flowcharts illustrating methods that support timing and synchronization techniques for secure networks in accordance with one or more aspects of the present disclosure.

FIG. 18 shows a flowchart illustrating a method 1800 that supports timing and synchronization techniques for secure networks in accordance with one or more aspects of the present disclosure. The operations of the method 1800 may be implemented by a UE or components thereof. For example, the operations of the method 1800 may be performed by a UE 115, as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 1805, the UE may monitor a set of time-frequency resources for one or more CDS associated with a pseudo-random sequence, where the pseudo-random sequence and the set of time-frequency resources are indicated by an output of a PRF that is based on a timing parameter, a cell ID, and a shared key. The operations of 1805 may be performed in accordance with examples disclosed herein. In some examples, aspects of the operations of 1805 may be performed by a resource monitoring component 1225, as described with reference to FIG. 12.

At 1810, the UE may communicate with a network entity via a cell associated with the cell ID based on monitoring the set of time-frequency resources for the one or more CDS. The operations of 1810 may be performed in accordance with examples disclosed herein. In some examples, aspects of the operations of 1810 may be performed by a communicating component 1230, as described with reference to FIG. 12.

Figure 19:
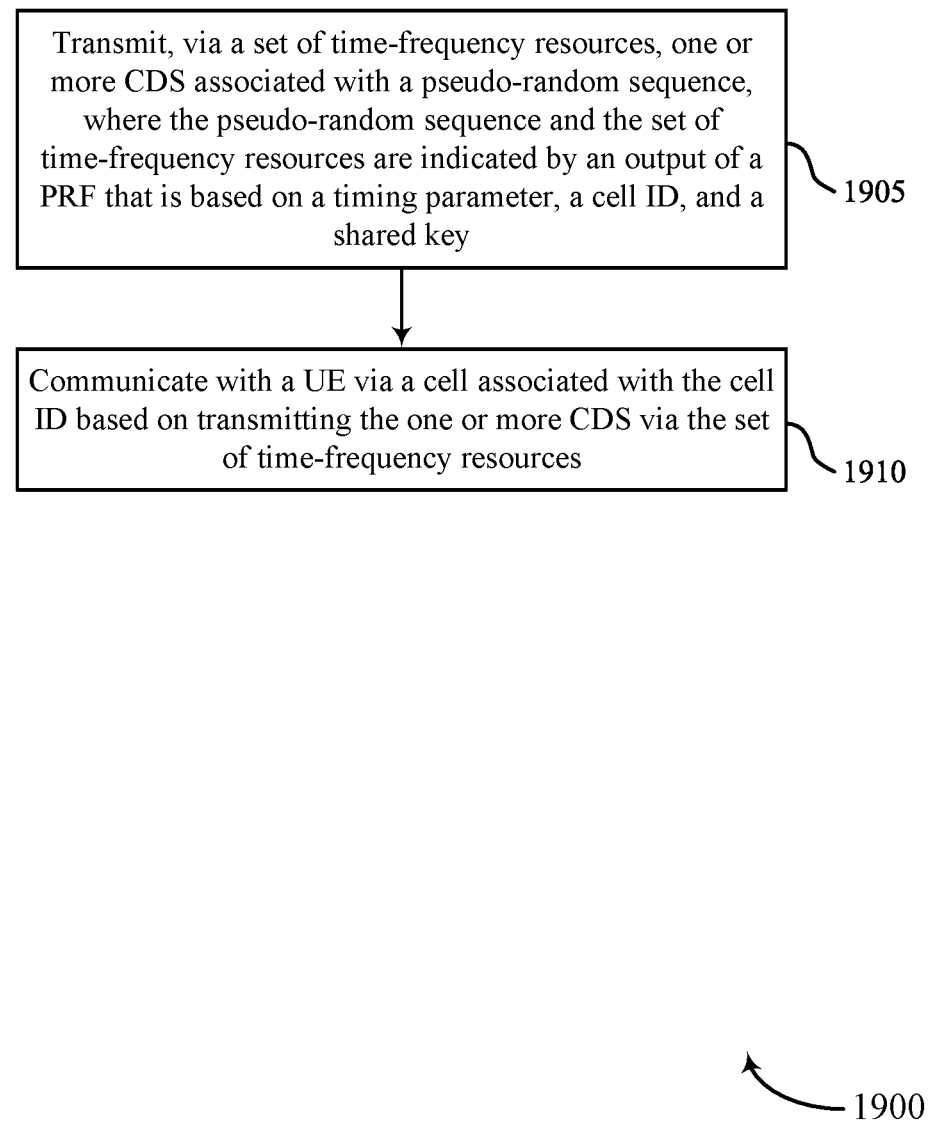

FIG. 19 shows a flowchart illustrating a method 1900 that supports timing and synchronization techniques for secure networks in accordance with one or more aspects of the present disclosure. The operations of the method 1900 may be implemented by a network entity or components thereof. For example, the operations of the method 1900 may be performed by a network entity 105, as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 1905, the network entity may transmit, via a set of time-frequency resources, one or more CDS associated with a pseudo-random sequence, where the pseudo-random sequence and the set of time-frequency resources are indicated by an output of a PRF that is based on a timing parameter, a cell ID, and a shared key. The operations of 1905 may be performed in accordance with examples disclosed herein. In some examples, aspects of the operations of 1905 may be performed by a CDS transmission component 1625, as described with reference to FIG. 16.

At 1910, the network entity may communicate with a UE via a cell associated with the cell ID based on transmitting the one or more CDS via the set of time-frequency resources. The operations of 1910 may be performed in accordance with examples disclosed herein. In some examples, aspects of the operations of 1910 may be performed by a communication component 1630, as described with reference to FIG. 16.

Figure 20:
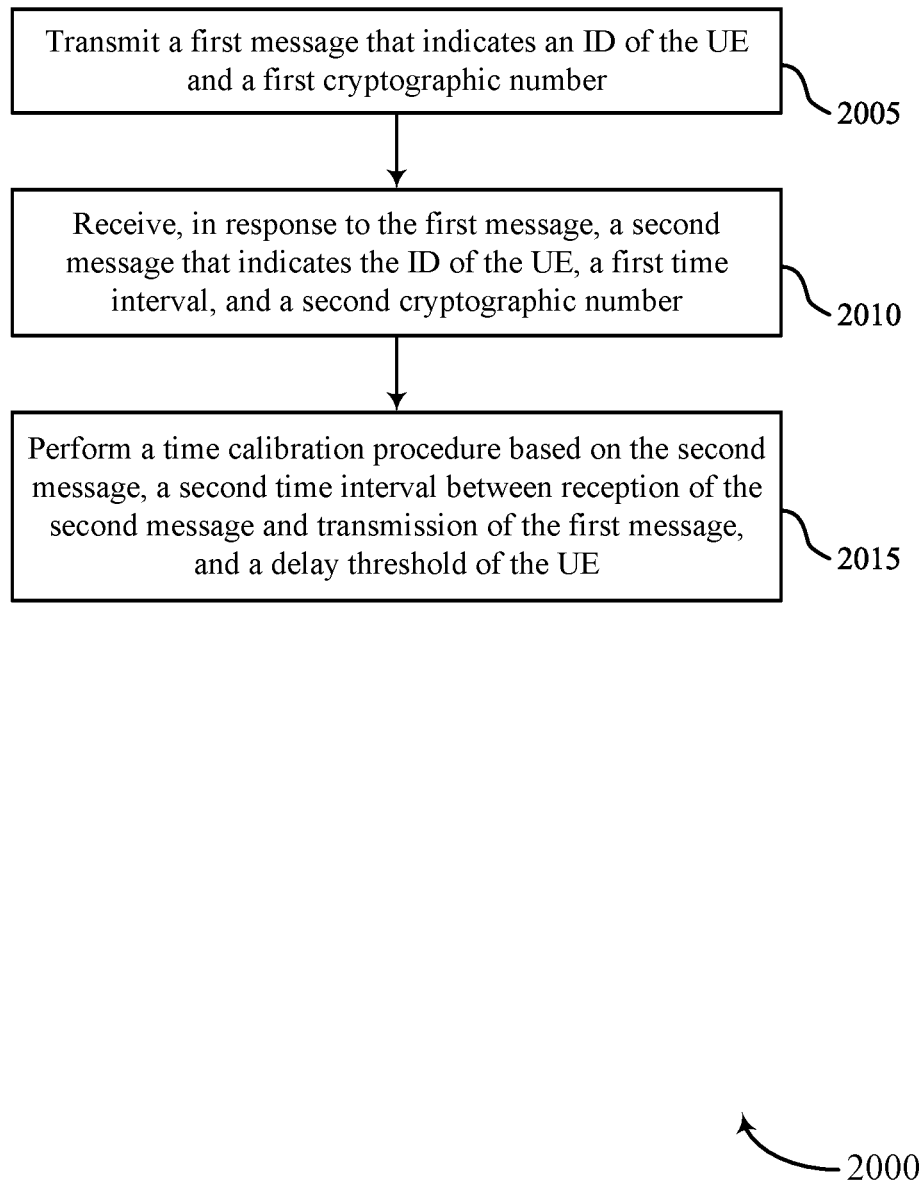

FIG. 20 shows a flowchart illustrating a method 2000 that supports timing and synchronization techniques for secure networks in accordance with one or more aspects of the present disclosure. The operations of the method 2000 may be implemented by a UE or components thereof. For example, the operations of the method 2000 may be performed by a UE 115, as described with reference to FIGS. 1 through 13. In some examples, a UE may execute a set of instructions to control the functional elements of the UE to perform the described functions. Additionally, or alternatively, the UE may perform aspects of the described functions using special-purpose hardware.

At 2005, the UE may transmit a first message that indicates an ID of the UE and a first cryptographic number. The operations of 2005 may be performed in accordance with examples disclosed herein. In some examples, aspects of the operations of 2005 may be performed by a message transmitting component 1235, as described with reference to FIG. 12.

At 2010, the UE may receive, in response to the first message, a second message that indicates the ID of the UE, a first time interval, and a second cryptographic number. The operations of 2010 may be performed in accordance with examples disclosed herein. In some examples, aspects of the operations of 2010 may be performed by a message receiving component 1240, as described with reference to FIG. 12.

At 2015, the UE may perform a time calibration procedure based on the second message, a second time interval between reception of the second message and transmission of the first message, and a delay threshold of the UE. The operations of 2015 may be performed in accordance with examples disclosed herein. In some examples, aspects of the operations of 2015 may be performed by a time calibrating component 1245, as described with reference to FIG. 12.

Figure 21:
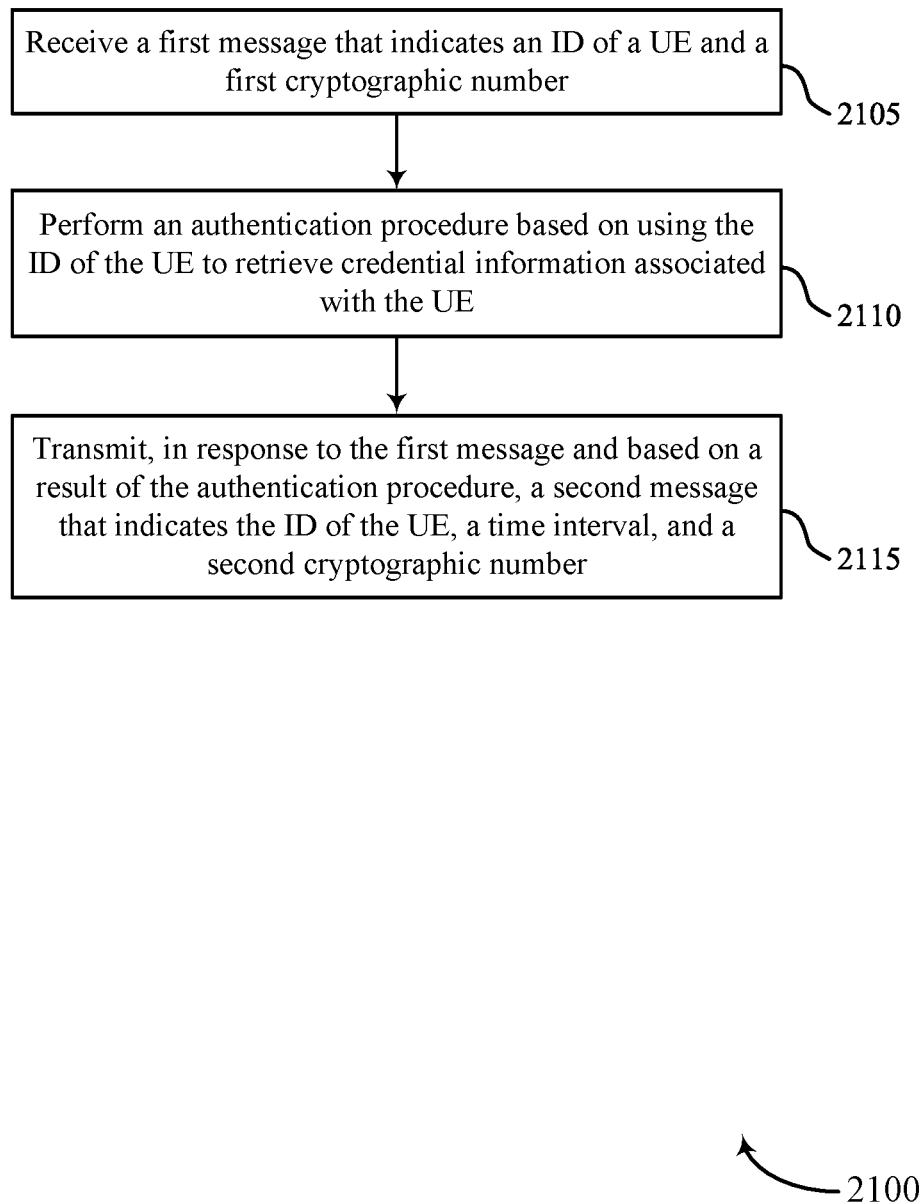

FIG. 21 shows a flowchart illustrating a method 2100 that supports timing and synchronization techniques for secure networks in accordance with one or more aspects of the present disclosure. The operations of the method 2100 may be implemented by a network entity or components thereof. For example, the operations of the method 2100 may be performed by a network entity 105, as described with reference to FIGS. 1 through 9 and 14 through 17. In some examples, a network entity may execute a set of instructions to control the functional elements of the network entity to perform the described functions. Additionally, or alternatively, the network entity may perform aspects of the described functions using special-purpose hardware.

At 2105, the network entity may receive a first message that indicates an ID of a UE and a first cryptographic number. The operations of 2105 may be performed in accordance with examples disclosed herein. In some examples, aspects of the operations of 2105 may be performed by a message reception component 1635, as described with reference to FIG. 16.

At 2110, the network entity may perform an authentication procedure based on using the ID of the UE to retrieve credential information associated with the UE. The operations of 2110 may be performed in accordance with examples disclosed herein. In some examples, aspects of the operations of 2110 may be performed by an authentication component 1640, as described with reference to FIG. 16.

At 2115, the network entity may transmit, in response to the first message and based on a result of the authentication procedure, a second message that indicates the ID of the UE, a time interval, and a second cryptographic number. The operations of 2115 may be performed in accordance with examples disclosed herein. In some examples, aspects of the operations of 2115 may be performed by a message transmission component 1645, as described with reference to FIG. 16.

The following provides an overview of aspects of the present disclosure:

Aspect 1: A method for wireless communication at a UE, comprising: monitoring a set of time-frequency resources for one or more cell detection signals associated with a pseudo-random sequence, wherein the pseudo-random sequence and the set of time-frequency resources are indicated by an output of a pseudo-random function that is based at least in part on a timing parameter, a cell identifier, and a shared key; and communicating with a network entity via a cell associated with the cell identifier based at least in part on monitoring the set of time-frequency resources for the one or more cell detection signals.

Aspect 2: The method of aspect 1, further comprising: obtaining two or more bit sequences based at least in part on making two or more calls to the pseudo-random function; and generating the pseudo-random sequence and resource location information by aggregating the two or more bit sequences, wherein the resource location information indicates the set of time-frequency resources.

Aspect 3: The method of any of aspects 1 through 2, further comprising: generating a first pseudo-random sequence and first frequency location at a first time; and generating a second pseudo-random sequence and second frequency location information at a second time, wherein a duration between the first time and the second time corresponds to a periodicity of the one or more cell detection signals.

Aspect 4: The method of any of aspects 1 through 3, further comprising: generating a plurality of bits that indicate one or more symbol locations and physical resource block locations to monitor for the one or more cell detection signals.

Aspect 5: The method of any of aspects 1 through 4, wherein monitoring the set of time-frequency resources comprises: performing a frequency-domain correlation of a plurality of resource elements in the set of time-frequency resources.

Aspect 6: The method of any of aspects 1 through 5, further comprising: identifying a plurality of cell groups associated with a respective plurality of cell group identifiers; and generating a pseudo-random output for each cell group of the plurality of cell groups based at least in part on the respective plurality of cell group identifiers, wherein the pseudo-random output comprises a pseudo-random sequence and a set of time-frequency resource locations associated with one of the plurality of cell groups.

Aspect 7: The method of aspect 6, further comprising: selecting a subset of the plurality of cell groups based at least in part on monitoring the set of time-frequency resource locations associated with each of the plurality of cell groups; and generating a pseudo-random output for each cell in the subset of the plurality of cell groups, wherein the pseudo-random output comprises a pseudo-random sequence and a set of time-frequency resource locations associated with a cell in the subset of the plurality of cell groups.

Aspect 8: The method of any of aspects 1 through 7, wherein the one or more cell detection signals comprise a primary cell detection signal that is time division multiplexed with a secondary cell detection signal.

Aspect 9: The method of any of aspects 1 through 8, further comprising: generating a pseudo-random cell identifier that is a function of the shared key, a physical cell identifier associated with the cell of the network entity, and a timestamp associated with generation of the pseudo-random cell identifier, wherein the output of the pseudo-random function is based at least in part on the pseudo-random cell identifier.

Aspect 10: The method of aspect 9, wherein the timestamp indicates a slot, a system frame number, or a coordinated universal time associated with generation of the pseudo-random cell identifier.

Aspect 11: The method of any of aspects 9 through 10, further comprising: performing a Boolean operation on one or more least significant bits of a pseudo-random output and the physical cell identifier associated with the cell of the network entity, wherein generating the pseudo-random cell identifier is based at least in part on a result of the Boolean operation.

Aspect 12: The method of any of aspects 1 through 11, further comprising: generating the output of the pseudo-random function based at least in part on a time drift threshold of the UE, wherein the output indicates a pseudo-random bit sequence and a set of time-frequency resource locations; and monitoring the set of time-frequency resource locations for one or more timing synchronization signals that indicate the pseudo-random bit sequence.

Aspect 13: The method of aspect 12, further comprising: acquiring absolute timing information based at least in part on measuring the one or more timing synchronization signals, wherein the timing parameter is based at least in part on the absolute timing information.

Aspect 14: A method for wireless communication at a network entity, comprising: transmitting, via a set of time-frequency resources, one or more cell detection signals associated with a pseudo-random sequence, wherein the pseudo-random sequence and the set of time-frequency resources are indicated by an output of a pseudo-random function that is based at least in part on a timing parameter, a cell identifier, and a shared key; and communicating with a UE via a cell associated with the cell identifier based at least in part on transmitting the one or more cell detection signals via the set of time-frequency resources.

Aspect 15: The method of aspect 14, further comprising: acquiring absolute timing information via a global navigation satellite system, wherein the timing parameter is based at least in part on the absolute timing information.

Aspect 16: The method of any of aspects 14 through 15, wherein transmitting the one or more cell detection signals comprises: transmitting the one or more cell detection signals via two or more carrier frequencies in accordance with a frequency hopping communication scheme.

Aspect 17: The method of any of aspects 14 through 16, wherein each cell of the network entity is associated with a different pseudo-random cell identifier.

Aspect 18: The method of any of aspects 14 through 17, further comprising: inputting, to the pseudo-random function, the shared key and a seed parameter that comprises an absolute time bit sequence, frequency bit sequence, a physical cell identifier bit sequence, a time-specific parameterization bit sequence, or a combination thereof, wherein the output of the pseudo-random function indicates the pseudo-random sequence and the set of time-frequency resources.

Aspect 19: The method of any of aspects 14 through 18, further comprising: generating a pseudo-random cell identifier for a cell of the network entity based at least in part on the shared key, a physical cell identifier of the cell, and a timestamp associated with generation of the pseudo-random cell identifier, wherein the output of the pseudo-random function is based at least in part on the pseudo-random cell identifier.

Aspect 20: A method for wireless communication at a UE, comprising: transmitting a first message that indicates an identifier of the UE and a first cryptographic number; receiving, in response to the first message, a second message that indicates the identifier of the UE, a first time interval, and a second cryptographic number; and performing a time calibration procedure based at least in part on the second message, a second time interval between reception of the second message and transmission of the first message, and a delay threshold of the UE.

Aspect 21: The method of aspect 20, wherein performing the time calibration procedure comprises: determining that a duration of the second time interval is less than a summation of the delay threshold and a duration of the first time interval; and updating one or more time settings of the UE based at least in part on a timestamp associated with transmission of the second message and a timestamp associated with reception of the second message.

Aspect 22: The method of aspect 20, wherein performing the time calibration procedure comprises: refraining from performing a timing adjustment based at least in part on determining that a duration of the second time interval is greater than a summation of the delay threshold and a duration of the first time interval, wherein the first time interval corresponds to a duration between transmission of the second message and reception of the first message.

Aspect 23: The method of any of aspects 20 through 22, wherein receiving the second message comprises: receiving an indication of an absolute time associated with transmission of the second message, a subframe associated with transmission of the second message, or both, wherein performing the time calibration procedure is based at least in part on the indication.

Aspect 24: The method of any of aspects 20 through 23, wherein: the first message comprises a physical uplink shared channel transmission that is scrambled using a first pseudo-random sequence; and the second message comprises a physical downlink shared channel transmission that is scrambled using a second pseudo-random sequence.

Aspect 25: The method of any of aspects 20 through 21, wherein performing the time calibration procedure comprises: determining that a product of a scaling factor and a duration of the first time interval is less than the delay threshold, wherein the scaling factor is based at least in part on an error rate associated with a local oscillator of the UE; and performing a time adjustment based at least in part on a timestamp associated with transmission of the second message and a timestamp associated with reception of the second message.

Aspect 26: The method of any of aspects 20 through 25, further comprising: transitioning from an unsynchronized timing state to a synchronized timing state after performing the time calibration procedure, wherein the UE initiates the time calibration procedure in response to entering the unsynchronized timing state.

Aspect 27: A method for wireless communication at a network entity, comprising: receiving a first message that indicates an identifier of a UE and a first cryptographic number; performing an authentication procedure based at least in part on using the identifier of the UE to retrieve credential information associated with the UE; and transmitting, in response to the first message and based at least in part on a result of the authentication procedure, a second message that indicates the identifier of the UE, a time interval, and a second cryptographic number.

Aspect 28: The method of aspect 27, wherein transmitting the second message comprises: transmitting an indication of a pseudo-random key to use for encrypting subsequent messages between the UE and the network entity.

Aspect 29: The method of any of aspects 27 through 28, wherein performing the authentication procedure comprises: obtaining a shared key based at least in part on the credential information associated with the UE; and validating a cryptographic signature of the first message based at least in part on the shared key.

Aspect 30: The method of any of aspects 27 through 29, further comprising: exchanging one or more messages with the UE to acquire a shared key prior to receiving the first message.

Aspect 31: An apparatus for wireless communication at a UE, comprising: a processor; memory coupled with the processor; and instructions stored in the memory, wherein the instructions are executable by the processor to cause the apparatus to perform a method of any of aspects 1 through 13.

Aspect 32: An apparatus for wireless communication at a UE, comprising at least one means for performing a method of any of aspects 1 through 13.

Aspect 33: A non-transitory computer-readable medium storing code for wireless communication at a UE, the code comprising instructions executable by a processor to perform a method of any of aspects 1 through 13.

Aspect 34: An apparatus for wireless communication at a network entity, comprising: a processor; memory coupled with the processor; and instructions stored in the memory, wherein the instructions are executable by the processor to cause the apparatus to perform a method of any of aspects 14 through 19.

Aspect 35: An apparatus for wireless communication at a network entity, comprising at least one means for performing a method of any of aspects 14 through 19.

Aspect 36: A non-transitory computer-readable medium storing code for wireless communication at a network entity, the code comprising instructions executable by a processor to perform a method of any of aspects 14 through 19.

Aspect 37: An apparatus for wireless communication at a UE, comprising: a processor; memory coupled with the processor; and instructions stored in the memory, wherein the instructions are executable by the processor to cause the apparatus to perform a method of any of aspects 20 through 26.

Aspect 38: An apparatus for wireless communication at a UE, comprising at least one means for performing a method of any of aspects 20 through 26.

Aspect 39: A non-transitory computer-readable medium storing code for wireless communication at a UE, the code comprising instructions executable by a processor to perform a method of any of aspects 20 through 26.

Aspect 40: An apparatus for wireless communication at a network entity, comprising: a processor; memory coupled with the processor; and instructions stored in the memory, wherein the instructions are executable by the processor to cause the apparatus to perform a method of any of aspects 27 through 30.

Aspect 41: An apparatus for wireless communication at a network entity, comprising at least one means for performing a method of any of aspects 27 through 30.

Aspect 42: A non-transitory computer-readable medium storing code for wireless communication at a network entity, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor; and
   memory coupled with the processor for storing instructions executable by the processor to cause the apparatus to:
      transmit a first message that indicates an identifier of the UE and a first cryptographic number;
      receive, in response to the first message, a second message that indicates the identifier of the UE, a first time interval, and a second cryptographic number; and
      perform a time calibration procedure based at least in part on the second message, a second time interval between reception of the second message and transmission of the first message, and a delay threshold of the UE,
      wherein, to perform the time calibration procedure, the instructions are executable by the processor to cause the apparatus to:
         determine that a duration of the second time interval is less than a summation of the delay threshold and a duration of the first time interval; and
         update one or more time settings of the UE based at least in part on a timestamp associated with transmission of the second message and a timestamp associated with reception of the second message.

2. The apparatus of claim 1, wherein, to perform the time calibration procedure, the instructions are executable by the processor to cause the apparatus to:
   refrain from performing a timing adjustment based at least in part on determining that a duration of the second time interval is greater than a summation of the delay threshold and a duration of the first time interval, wherein the first time interval corresponds to a duration between transmission of the second message and reception of the first message.

3. The apparatus of claim 1, wherein, to receive the second message, the instructions are executable by the processor to cause the apparatus to:
receive an indication of an absolute time associated with transmission of the second message, a subframe associated with transmission of the second message, or both, wherein performing the time calibration procedure is based at least in part on the indication.

4. The apparatus of claim 1, wherein:
the first message comprises a physical uplink shared channel transmission that is scrambled using a first pseudo-random sequence; and
the second message comprises a physical downlink shared channel transmission that is scrambled using a second pseudo-random sequence.

5. The apparatus of claim 1, wherein, to perform the time calibration procedure, the instructions are executable by the processor to cause the apparatus to:
determine that a product of a scaling factor and a duration of the first time interval is less than the delay threshold, wherein the scaling factor is based at least in part on an error rate associated with a local oscillator of the UE; and
perform a time adjustment based at least in part on a timestamp associated with transmission of the second message and a timestamp associated with reception of the second message.

6. The apparatus of claim 1, wherein the instructions are further executable by the processor to cause the apparatus to:
transition from an unsynchronized timing state to a synchronized timing state after performing the time calibration procedure, wherein the UE initiates the time calibration procedure in response to entering the unsynchronized timing state.

7. A method of wireless communication performed by a user equipment (UE), comprising:
transmitting a first message that indicates an identifier of the UE and a first cryptographic number;
receiving, in response to the first message, a second message that indicates the identifier of the UE, a first time interval, and a second cryptographic number; and
performing a time calibration procedure based at least in part on the second message, a second time interval between reception of the second message and transmission of the first message, and a delay threshold of the UE,
wherein said performing the time calibration procedure comprises:
determining that a duration of the second time interval is less than a summation of the delay threshold and a duration of the first time interval; and
updating one or more time settings of the UE based at least in part on a timestamp associated with transmission of the second message and a timestamp associated with reception of the second message.

8. The method of claim 7, wherein said performing the time calibration procedure comprises:
refraining from performing a timing adjustment based at least in part on determining that a duration of the second time interval is greater than a summation of the delay threshold and a duration of the first time interval, wherein the first time interval corresponds to a duration between transmission of the second message and reception of the first message.

9. The method of claim 7, wherein said receiving the second message comprises:
receiving an indication of an absolute time associated with transmission of the second message, a subframe associated with transmission of the second message, or both, wherein said performing the time calibration procedure is based at least in part on the indication.

10. The method of claim 7, wherein the first message comprises a physical uplink shared channel transmission that is scrambled using a first pseudo-random sequence, and the second message comprises a physical downlink shared channel transmission that is scrambled using a second pseudo-random sequence.

11. The method of claim 7, wherein said performing the time calibration procedure comprises:
determining that a product of a scaling factor and a duration of the first time interval is less than the delay threshold, wherein the scaling factor is based at least in part on an error rate associated with a local oscillator of the UE; and
performing a time adjustment based at least in part on a timestamp associated with transmission of the second message and a timestamp associated with reception of the second message.

12. The method of claim 7, further comprising:
transitioning from an unsynchronized timing state to a synchronized timing state after said performing the time calibration procedure, wherein the UE initiates the time calibration procedure in response to entering the unsynchronized timing state.

* * * * *